Aug. 11, 1936.  H. R. SCHUTZ  2,050,386
GLASSWORKING APPARATUS
Filed March 9, 1935   16 Sheets-Sheet 1

Inventor.
Harold R. Schutz
By Barnett & Truman
Attorneys.

Aug. 11, 1936.   H. R. SCHUTZ   2,050,386
GLASSWORKING APPARATUS
Filed March 9, 1935   16 Sheets-Sheet 2
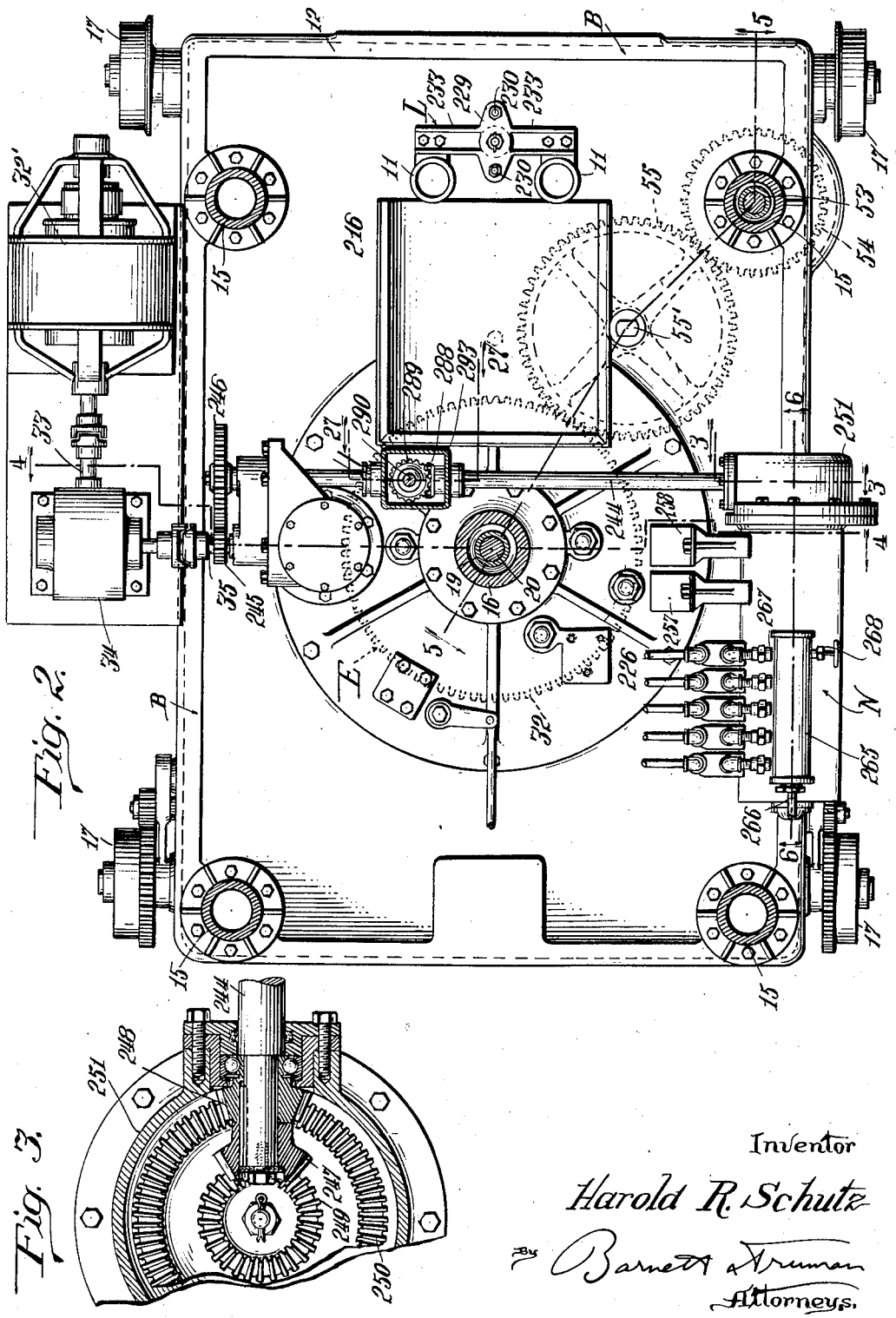
Inventor
Harold R. Schutz
By Barnett & Truman
Attorneys.

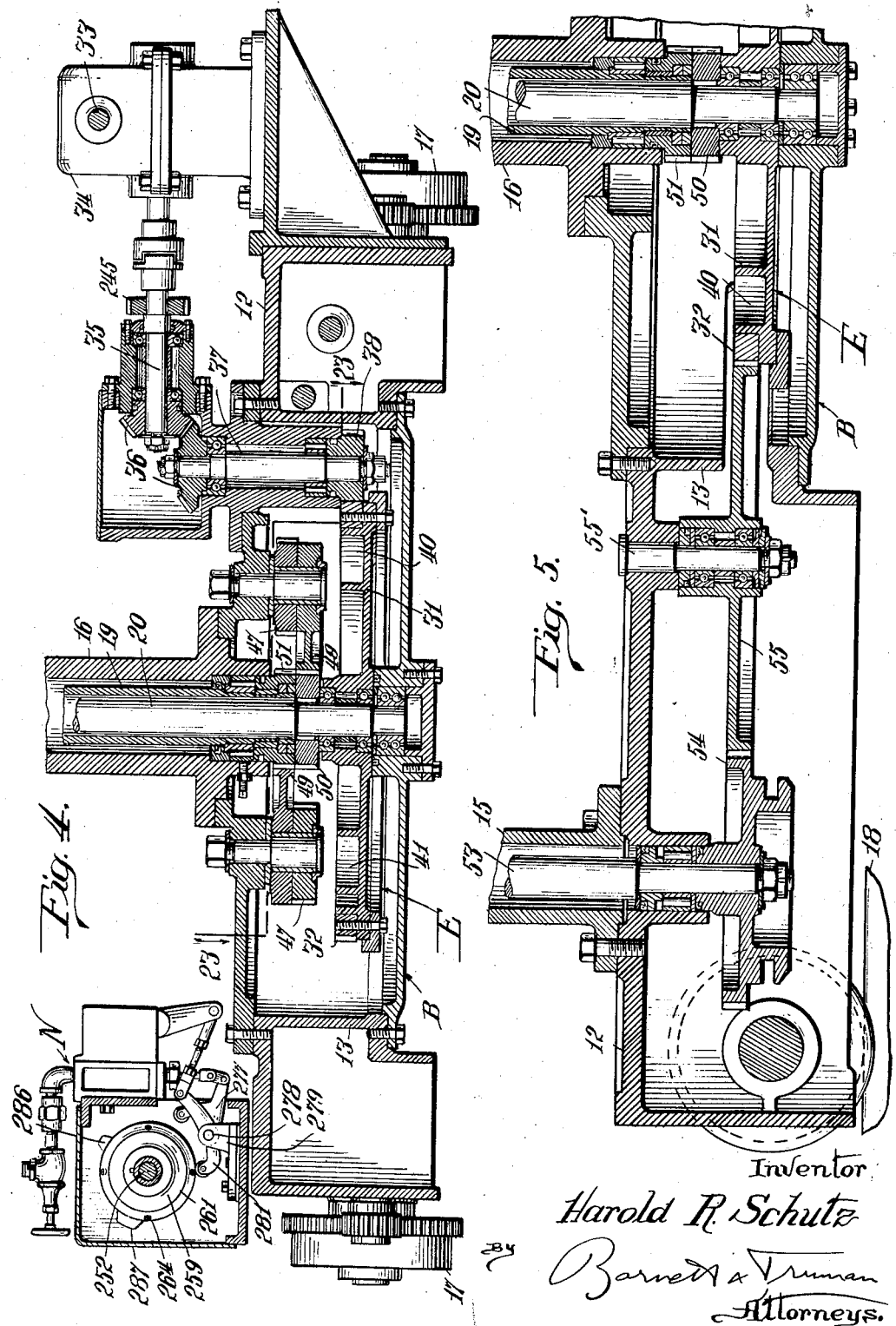

Aug. 11, 1936.   H. R. SCHUTZ   2,050,386
GLASSWORKING APPARATUS
Filed March 9, 1935   16 Sheets-Sheet 4

Fig. 6.

Inventor.
Harold R. Schutz
By
Barnett & Truman
Attorneys.

Aug. 11, 1936.  H. R. SCHUTZ  2,050,386
GLASSWORKING APPARATUS
Filed March 9, 1935   16 Sheets-Sheet 5
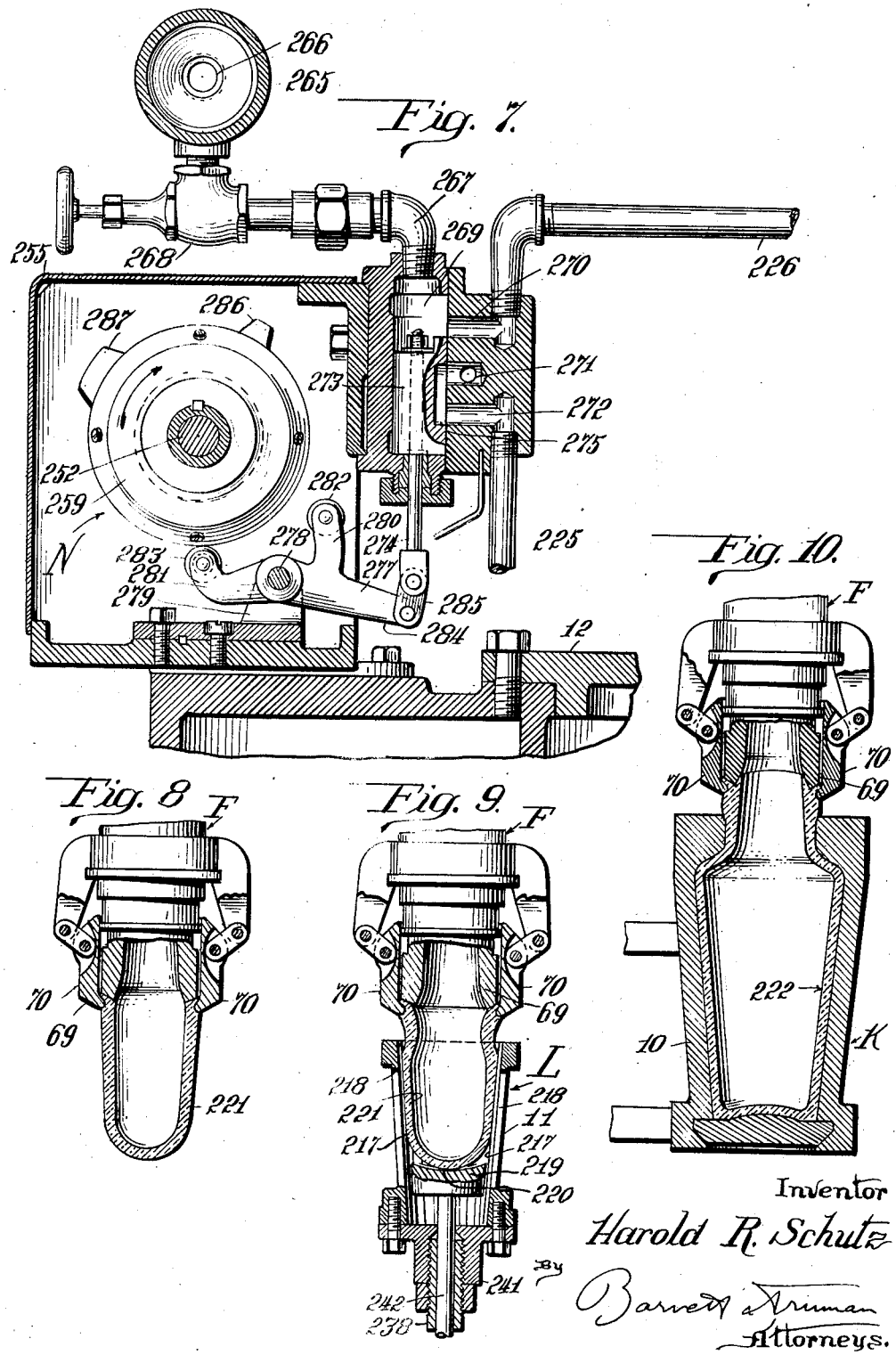
Inventor
Harold R. Schutz
By Barrett & Truman
Attorneys.

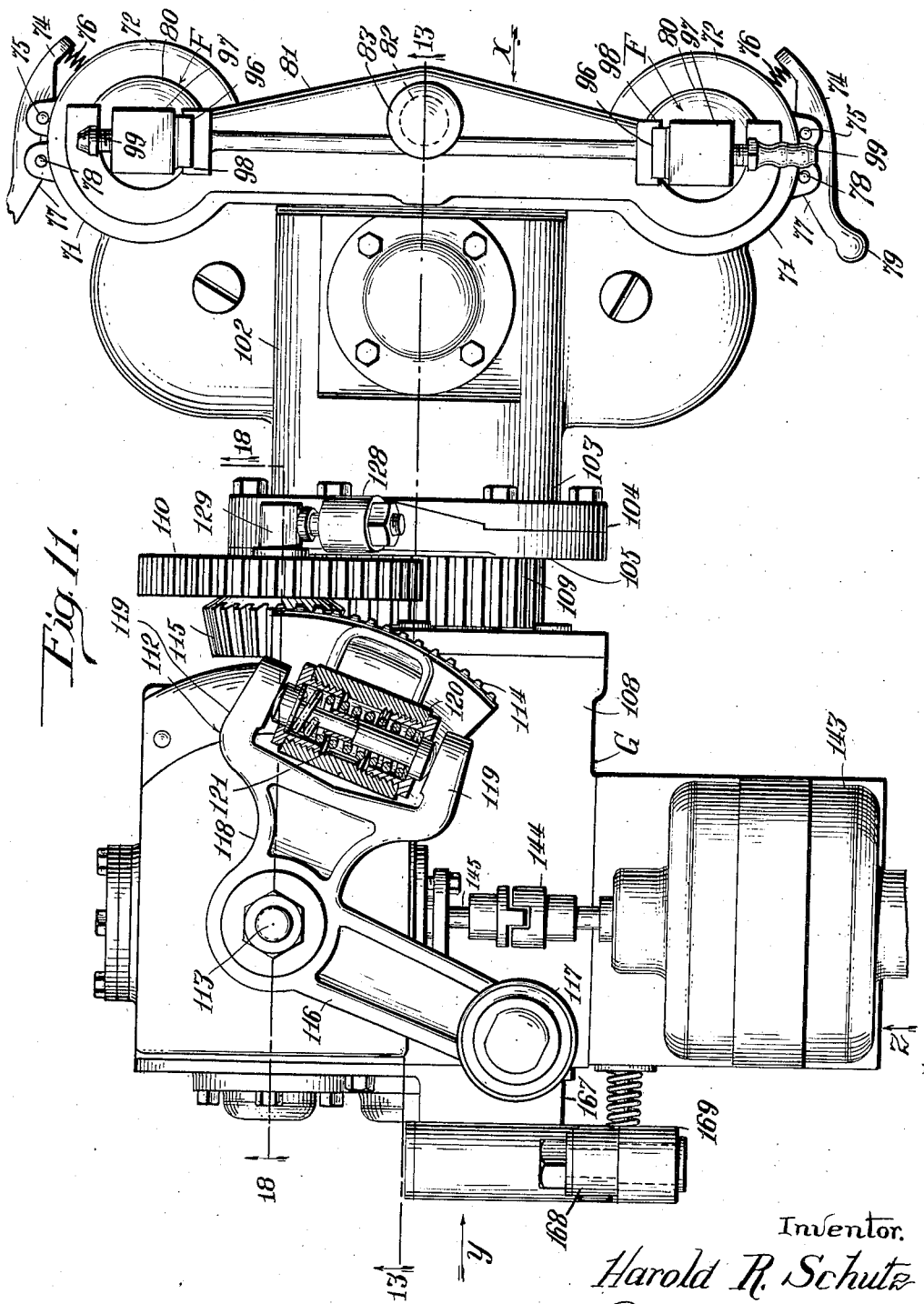

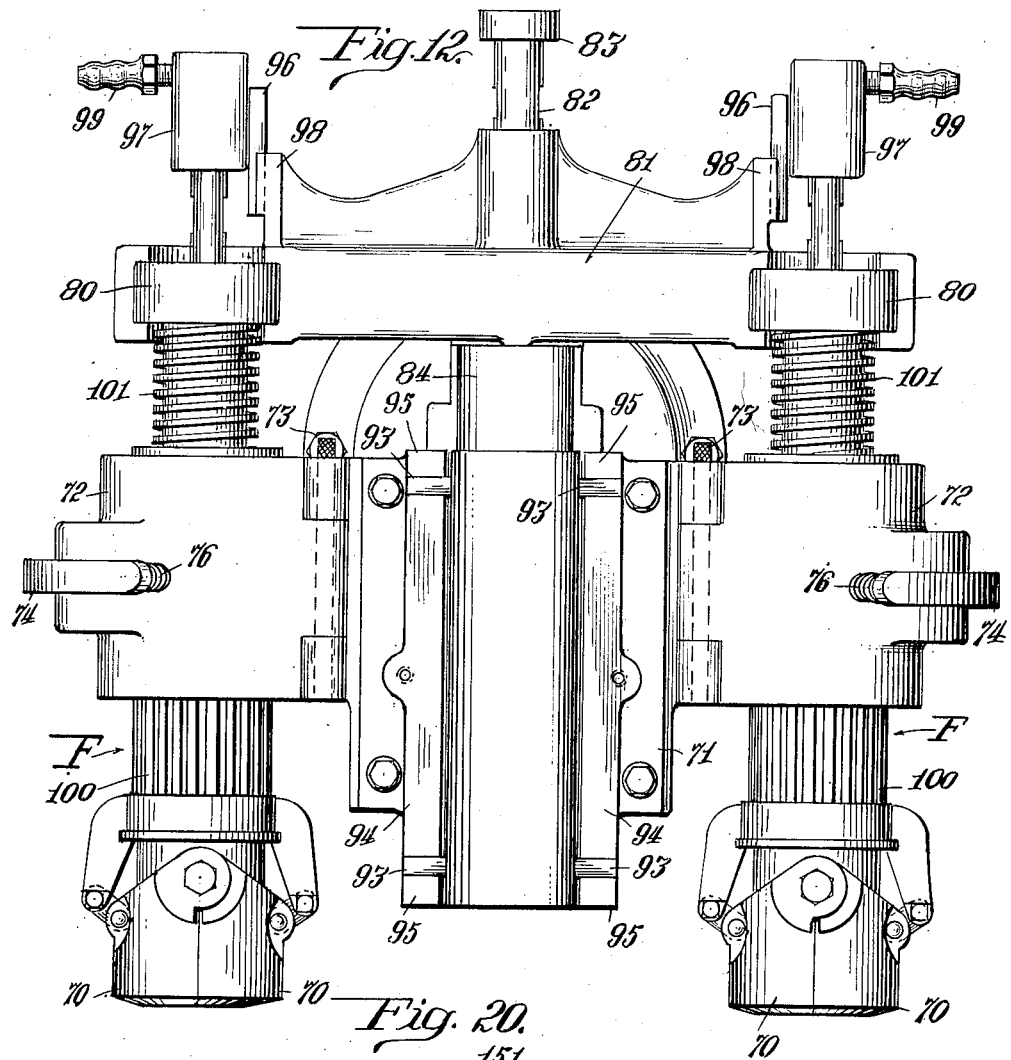
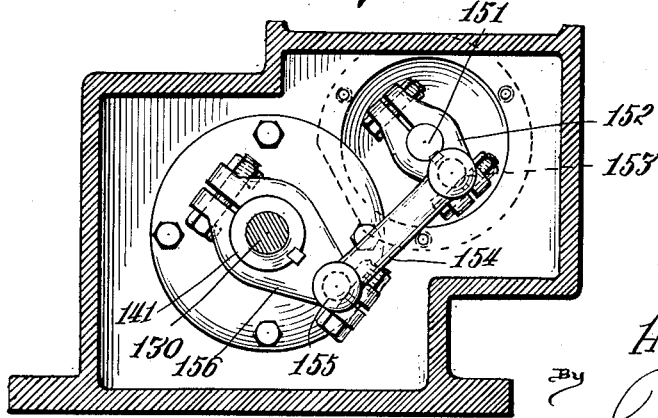

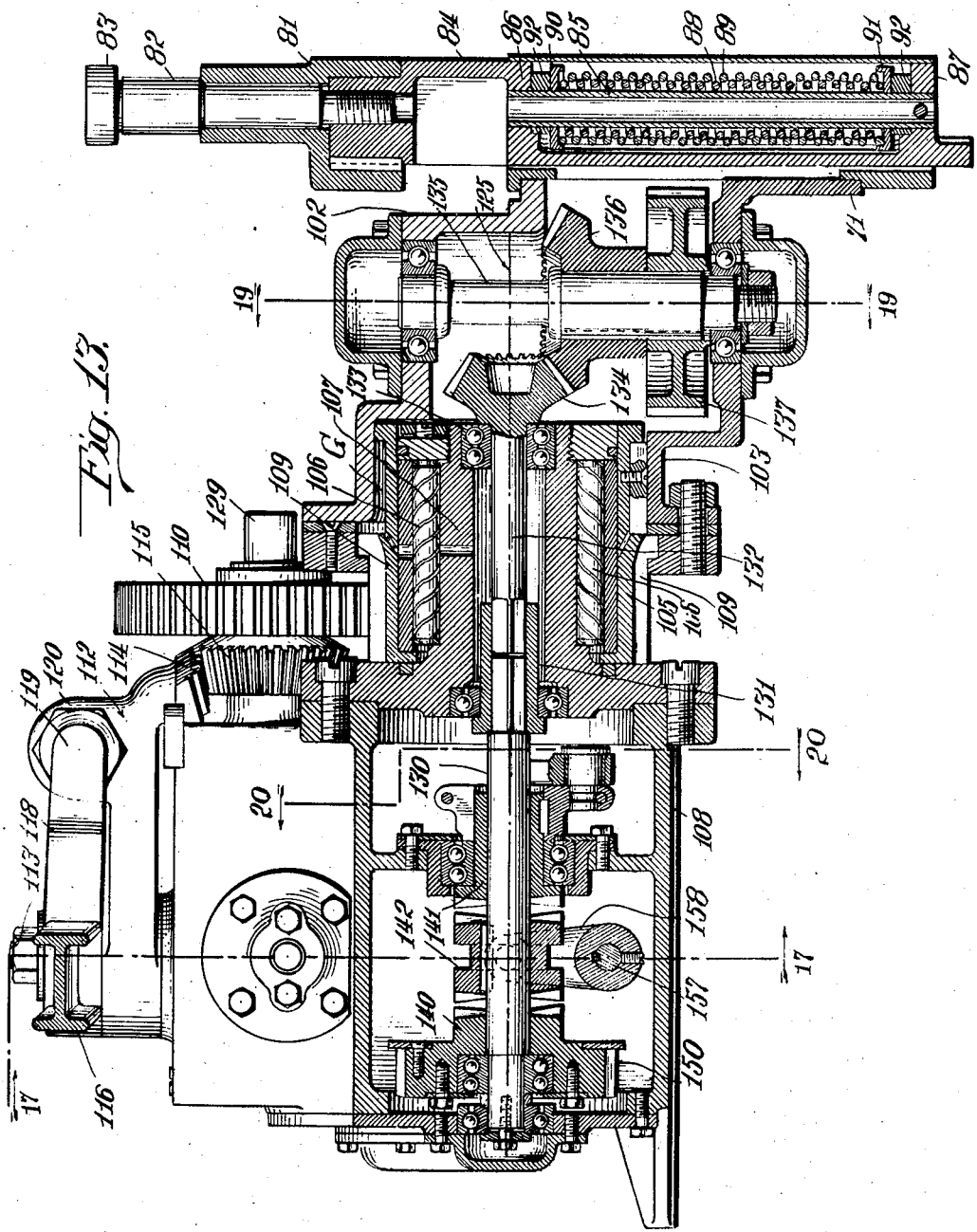

Aug. 11, 1936.                H. R. SCHUTZ                2,050,386
                         GLASSWORKING APPARATUS
                    Filed March 9, 1935      16 Sheets-Sheet 9
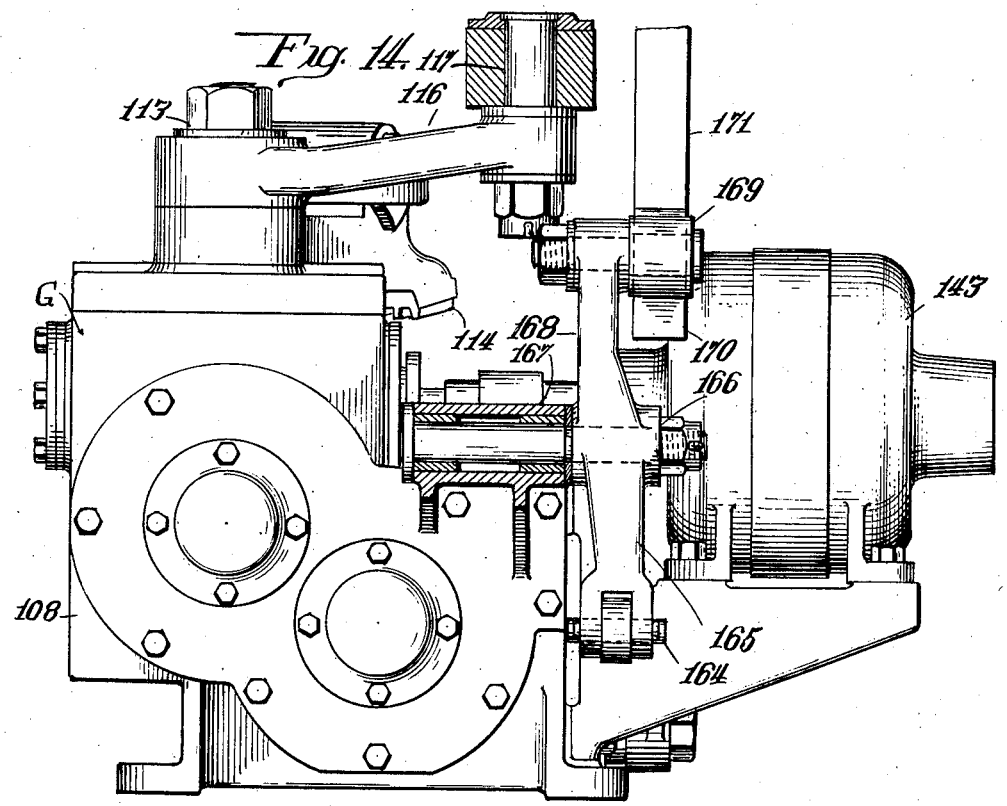
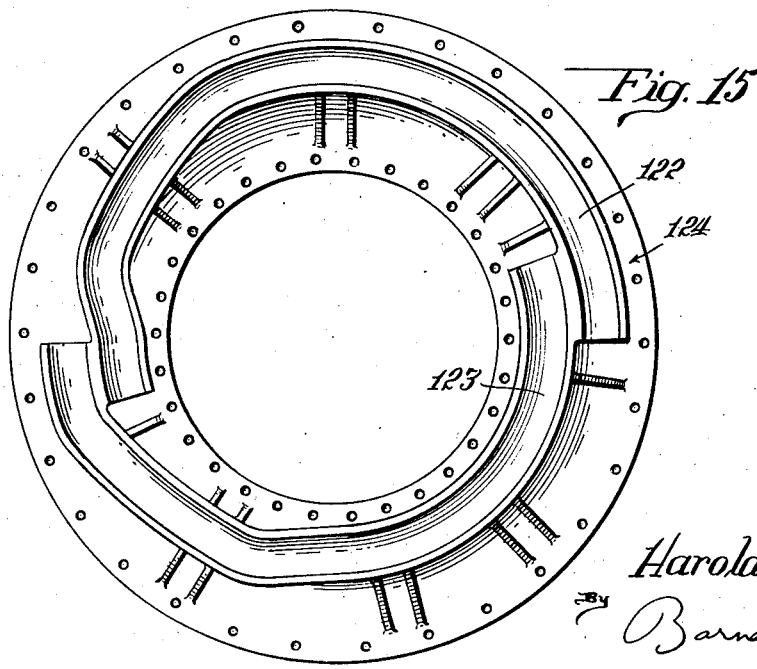
Inventor
Harold R. Schutz
By Barnett Truman
Attorneys

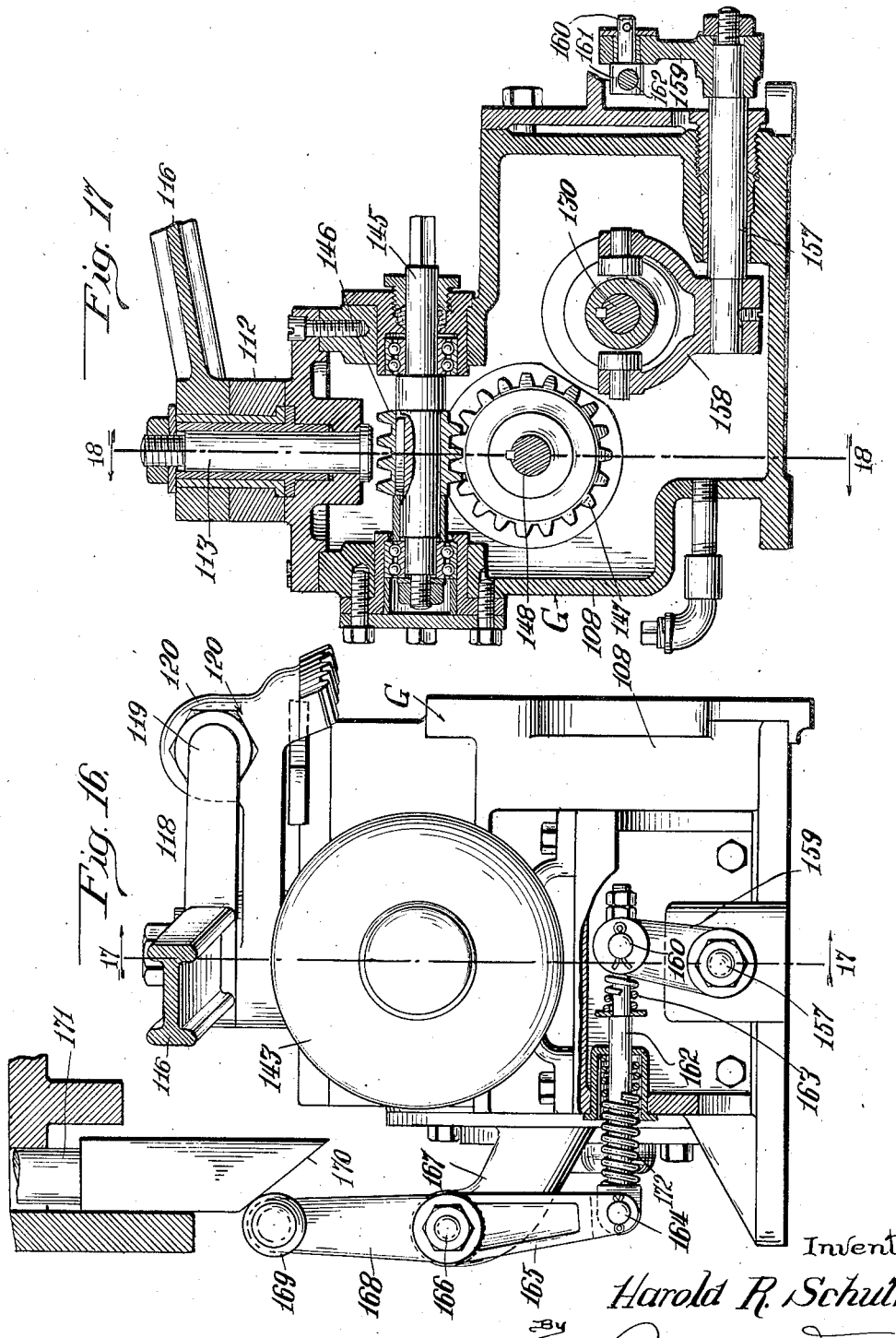

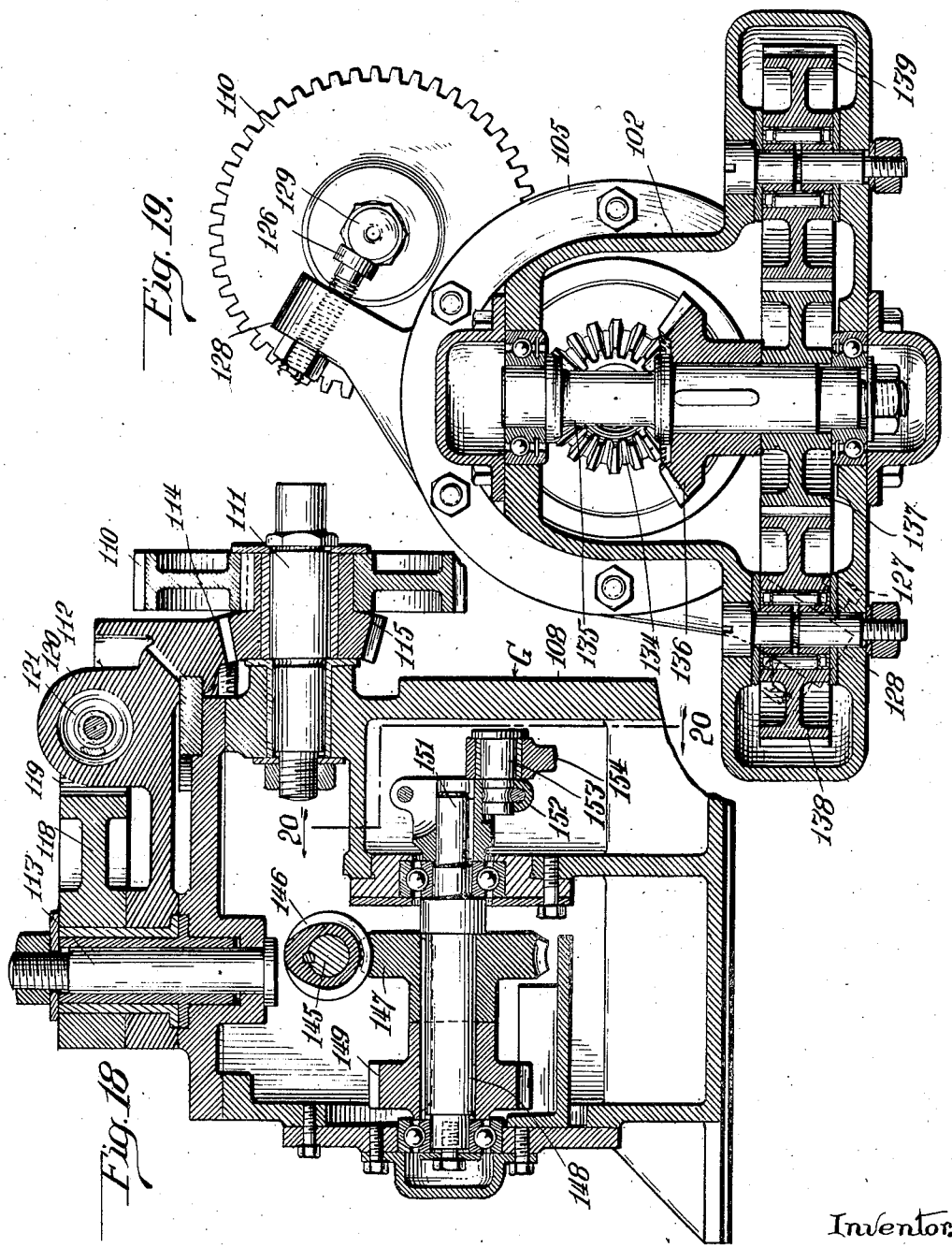

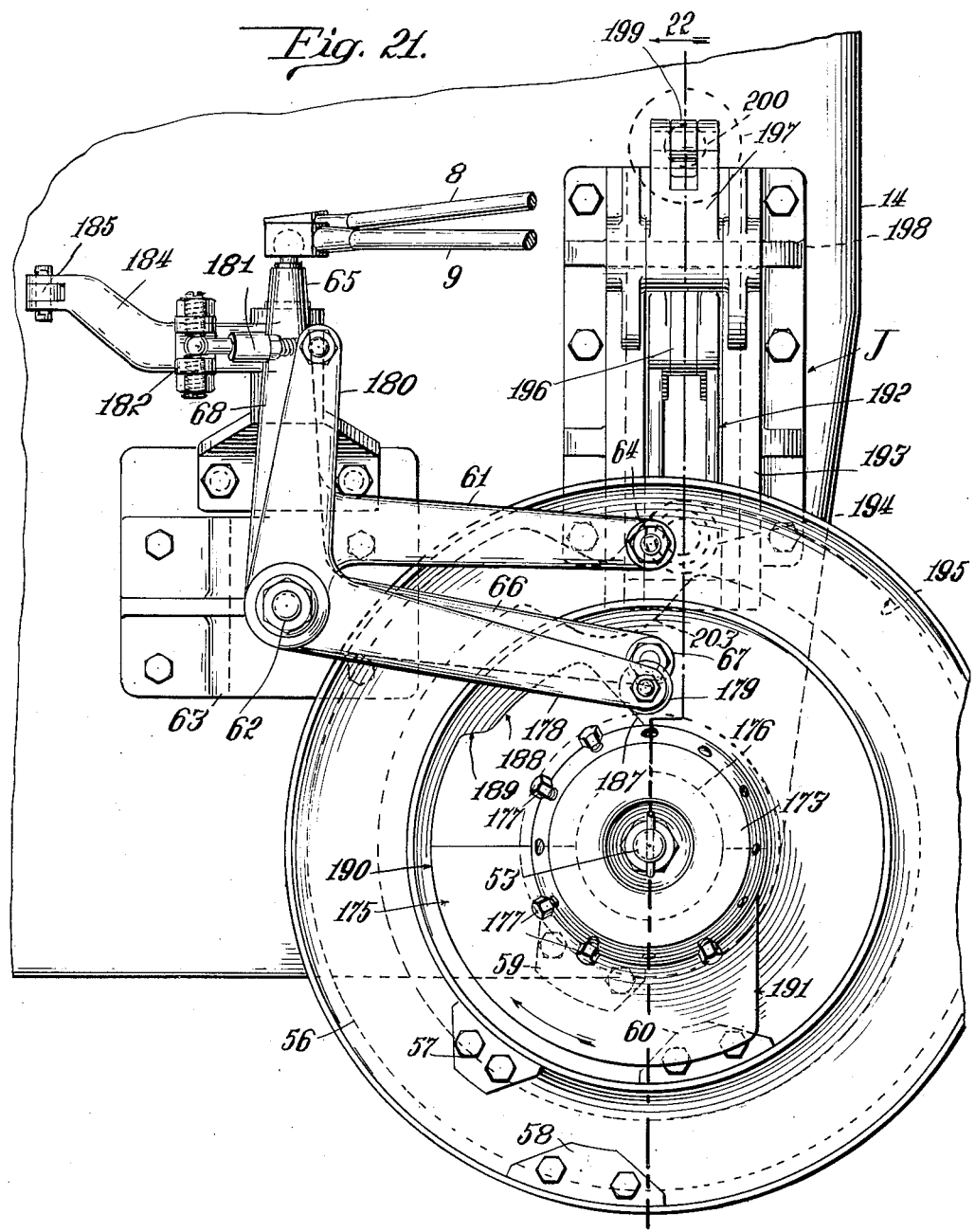

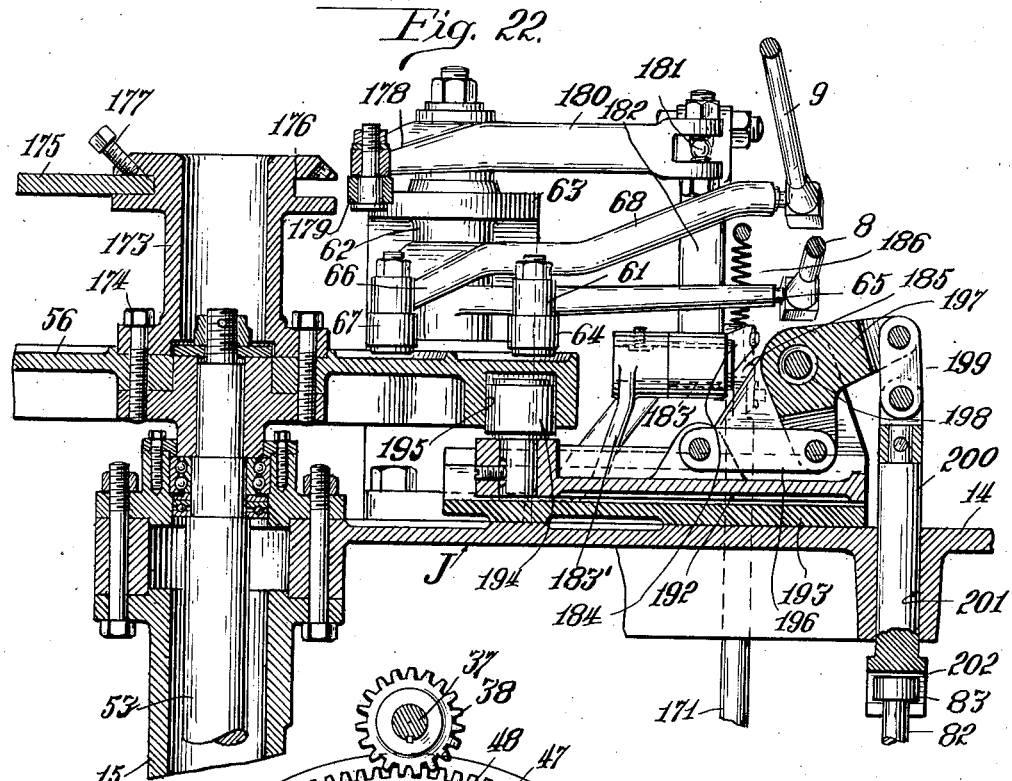
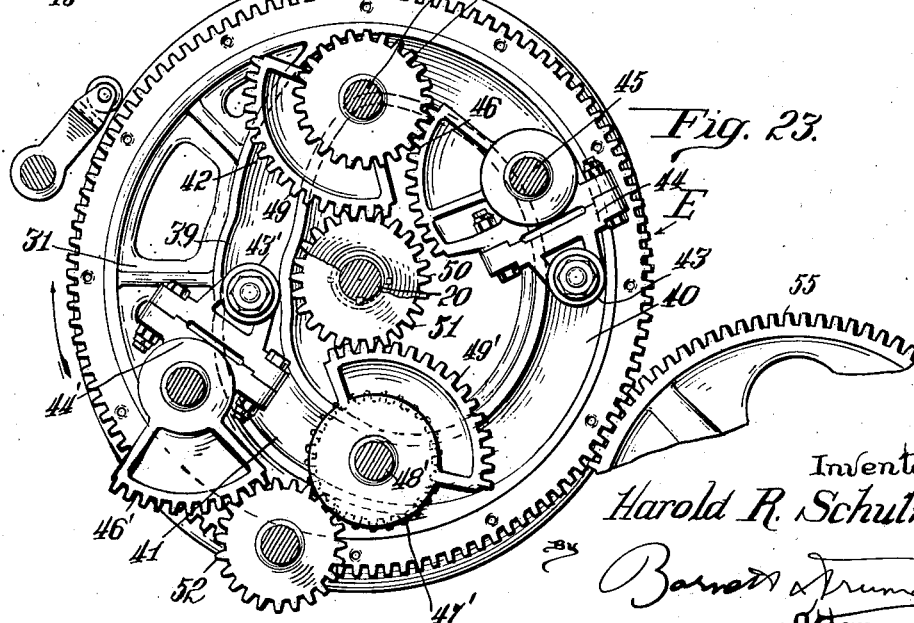

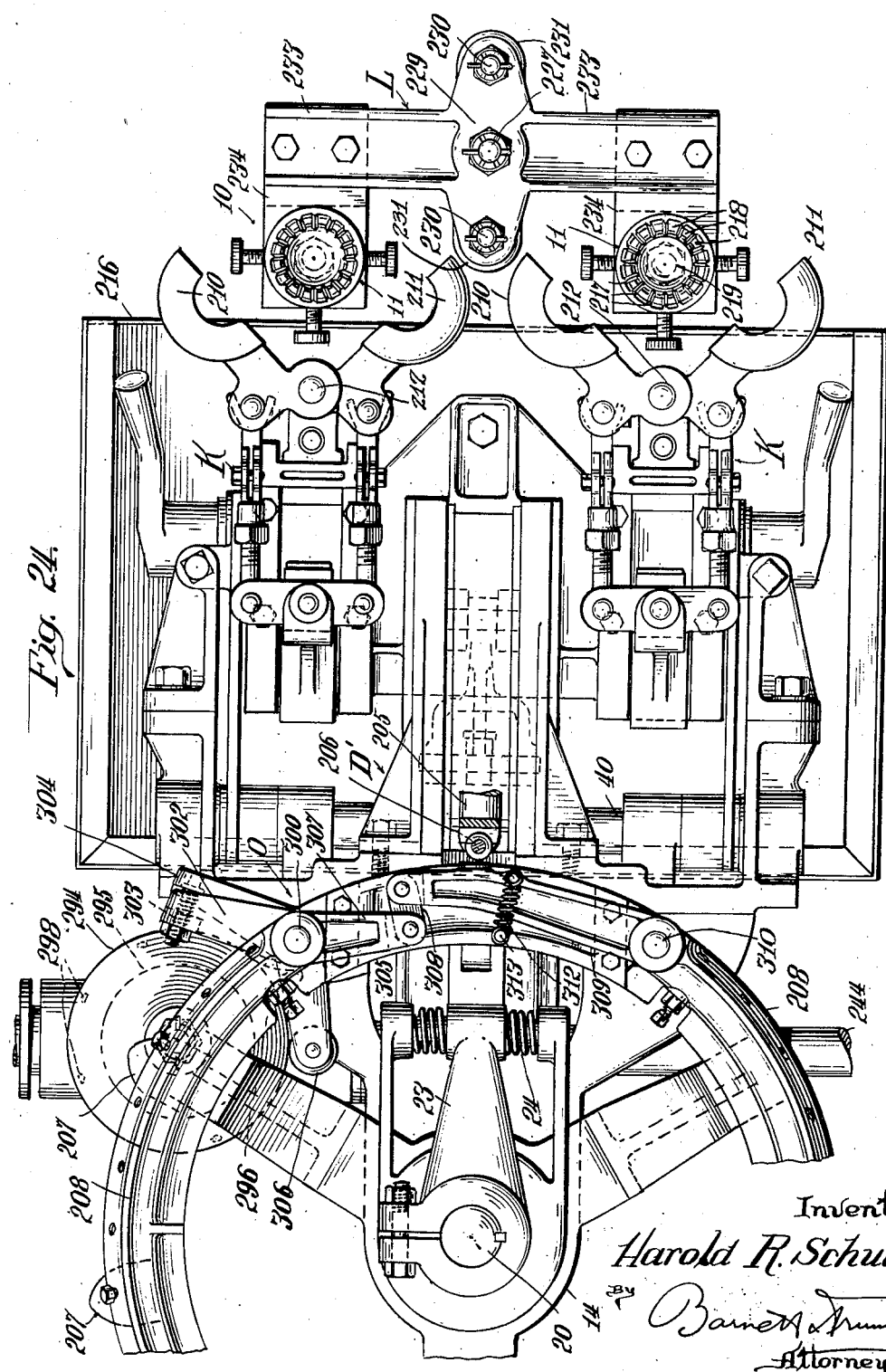

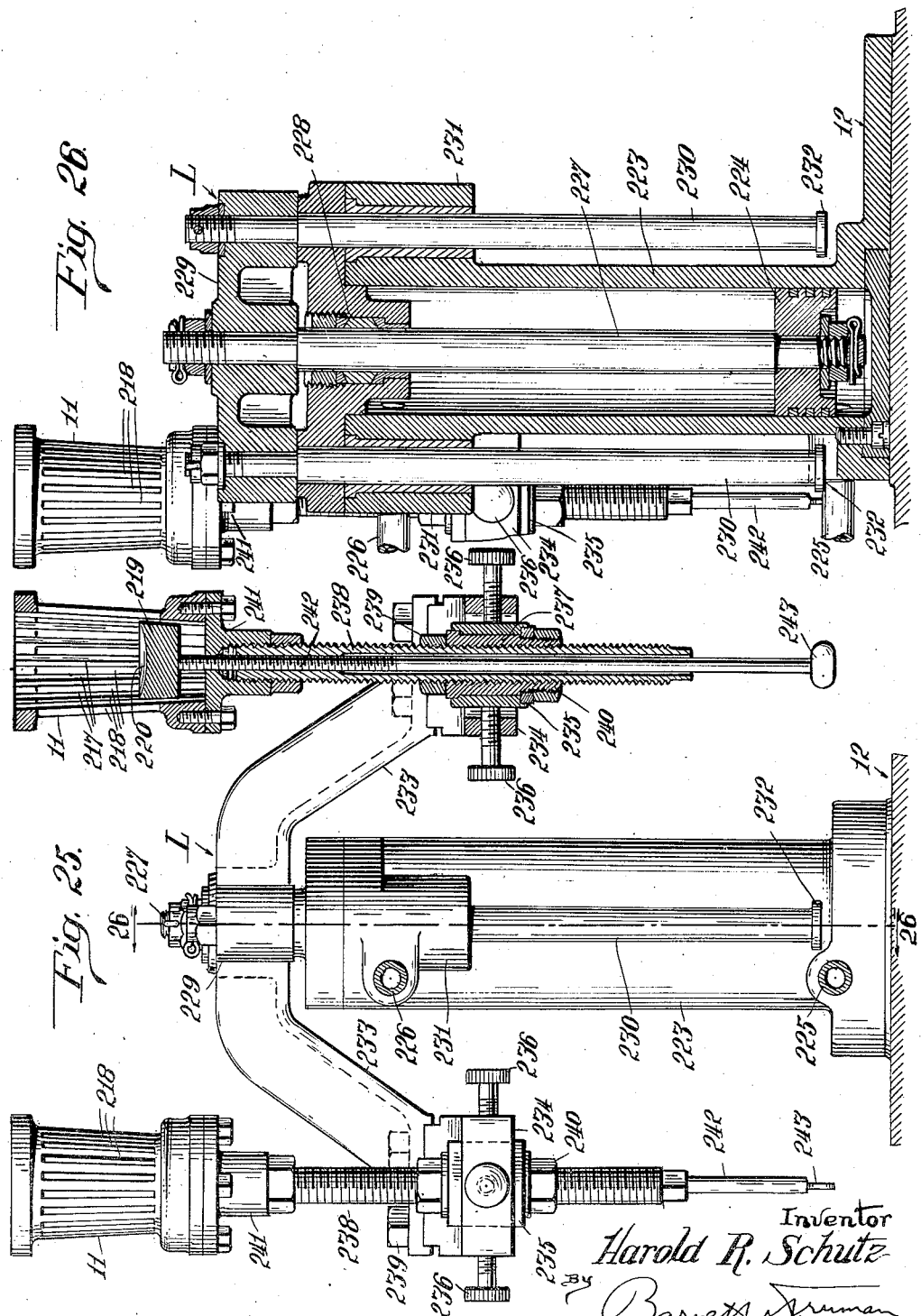

Aug. 11, 1936.  H. R. SCHUTZ  2,050,386
GLASSWORKING APPARATUS
Filed March 9, 1935   16 Sheets—Sheet 16
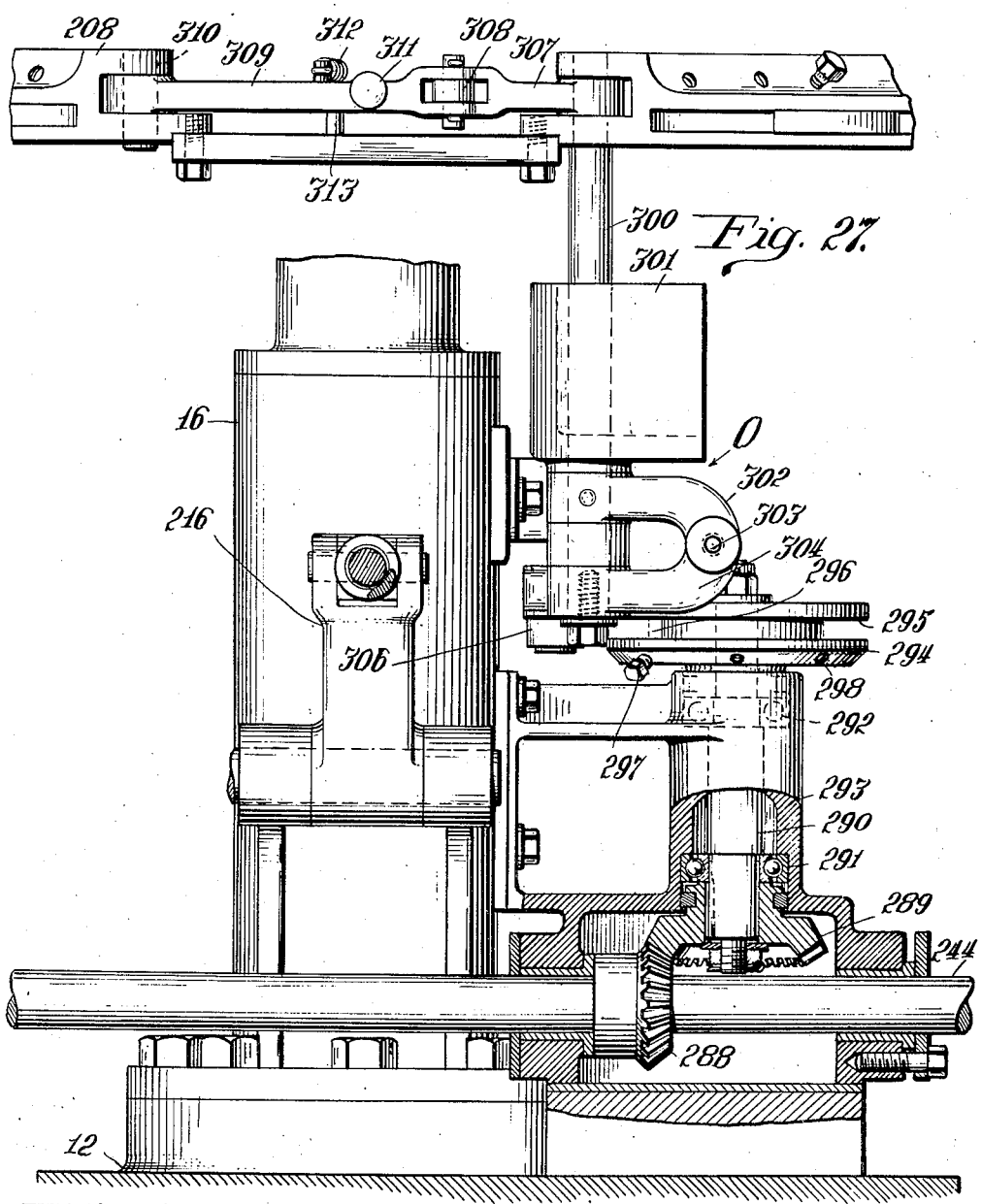
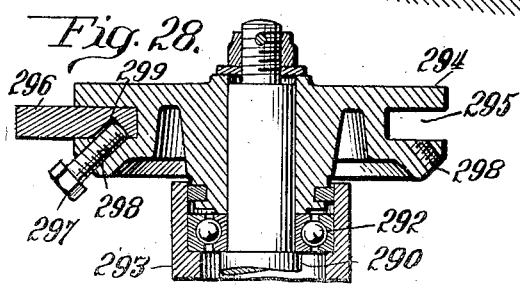
Inventor
Harold R. Schutz
By Barrett & Truman
Attorneys.

Patented Aug. 11, 1936

2,050,386

UNITED STATES PATENT OFFICE 2,050,386

GLASSWORKING APPARATUS

Harold R. Schutz, Toledo, Ohio, assignor, by mesne assignments, to Libbey Glass Co., Toledo, Ohio, a corporation of Ohio Application March 9, 1935, Serial No. 10,182

20 Claims. (Cl. 49—5)

This invention relates to certain new and useful improvements in glass working apparatus of the type adapted to form hollow glass articles by a succession of steps comprising gathering a blank of molten glass from a furnace, shaping the blank by swinging and spinning operations and by blowing air into the hollow blank, and expanding the hollow blank by internal air pressure within a mold so as to give the desired shape to the hollow glass article. The particular improvements of the present invention relate to an improved form of "optic" mechanism adapted to produce hollow glassware having walls of varying thickness so as to give a wavy appearance as the light passes therethrough. This is accomplished by slightly chilling the walls of the partly completed molten glass blank or parison at spaced intervals. When this blank is further expanded to final form within the finishing mold, the hotter glass between the chilled portions will be stretched thinner, leaving spaced apart thicker ribs on the inner surface of the article, the outer surface having a true circular cross-section since it is blown into contact with the walls of the finishing mold.

The particular machine or apparatus to which the present improvements are here applied is disclosed more in detail and claimed in my copending application Serial No. 621,854, filed July 11, 1932. This machine comprises two similar independently movable but cooperatively timed spindle carrying heads which swing about a central vertical axis between a gathering station positioned adjacent the furnace and a molding or finishing station positioned substantially 180° therefrom. The two heads oscillate back and forth through opposite arcs of substantially 180° each between the two stations. A gathering mechanism positioned adjacent the furnace is adapted to successively deliver blanks of molten glass to the two spindle mechanisms as they come into position at the gathering station. A molding mechanism, permanently positioned at the molding station, is adapted to successively cooperate with the two spindle mechanisms as they come into position and dwell at the molding station. A single means is provided for independently swinging the two heads, in properly timed relation, between the two stations with suitable dwells at each station. In the apparatus disclosed in said copending application, a suitable glass treating or "optic" mechanism is provided for each head, these mechanisms being located at stations along the path of travel of each head, the respective heads dwelling briefly at each of these stations as the heads move from the gathering station to the molding station.

According to the present improvements, a single "optic" mechanism is located at the molding station and timed to cooperate with each of the heads as these heads successively come into position at the molding station. This mechanism comprises an optic mold (or pair of molds) which is raised into position about the parison as the head begins its dwell at the molding or finishing station. The blank or parison is then partially expanded within this optic mold, after which the optic mold is withdrawn and the finishing mold is moved into position about the parison and the blowing operation is completed. This improved "optic" mechanism comprises fluid-pressure operated means for supporting the optic mold and moving same into and out of position around the parison, together with a plurality of automatically actuated valves for controlling the flow of pressure fluid to the mold operating mechanism, and controlling the flow of air into the partially formed blank, in properly timed relation to the spindle and finishing mold movements. Means is also provided for selectively rotating or oscillating the spindle, or permitting it to remain idle during different successive periods of the cycle of operations as will be hereinafter explained in detail.

The principal object of this invention is to provide an improved glass working apparatus of the type briefly described hereinabove and disclosed more in detail in the specifications which follow.

Another object is to provide an improved form of "optic" mechanism especially adapted to cooperate with a glass working machine of this type.

Another object is to provide improved means for controlling the valves in a machine of this type.

Another object is to provide improved means for selectively controlling the spindle rotating and oscillating mechanism.

Other objects and advantages of this invention will be more apparent from the following detailed description of one approved form of apparatus designed and operating according to the principles of this invention.

In the accompanying drawings:

Fig. 2 is a horizontal section taken substantially on the line 2—2 of Fig. 1, with the finishing mold apparatus omitted.

Fig. 3 is a detail vertical section taken substantially on the line 3—3 of Figs. 2 and 6.

Fig. 4 is a transverse vertical section, taken substantially on the line 4—4 of Fig. 2.

Fig. 5 is a partial vertical section, taken substantially on the line 5—5 of Fig. 2.

Fig. 6 is an enlarged vertical section through the valve and switch operating assembly, the view being taken substantially on the line 6—6 of Fig. 2 with portions shown in elevation.

Fig. 7 is a vertical section, taken substantially on the line 7—7 of Fig. 6.

Figs. 8, 9 and 10 are similar diagrammatic views illustrating three successive steps in the formation of the glass article.

Fig. 11 is an enlarged plan view of one of the spindle assemblies, consisting of a pair of similar spindles and the mechanism for inverting the spindles and alternatively rotating or oscillating the spindles.

Fig. 12 is a front elevation of one pair of spindles and the supporting mechanism therefor, this view being taken looking in the direction of the arrows $x$ as shown on Figs. 1 and 11.

Fig. 13 is a longitudinal vertical section taken substantially on the line 13—13 of Fig. 11.

Fig. 14 is an end elevation looking at the spindle assembly from the left or in the direction of the arrow $y$ as seen in Fig. 11.

Fig. 15 is an inverted plan view of the spindle inverting cam, this view being taken looking substantially from the line 15—15 of Fig. 1 in the direction of the arrows.

Fig. 16 is a side elevation of a portion of the spindle-operating assembly, the view being taken looking substantially in the direction of the arrow $z$ of Fig. 11.

Fig. 17 is a vertical section, taken substantially on the line 17—17 of Figs. 13 and 16.

Fig. 18 is a vertical section, taken substantially on the line 18—18 of Figs. 17 or 11.

Fig. 19 is a vertical section taken substantially on the line 19—19 of Fig. 13.

Fig. 20 is a detail vertical section showing the oscillating mechanism, the view being taken substantially on the line 20—20 of Figs. 13 and 18.

Fig. 21 is an enlarged horizontal section, taken substantially on the line 21—21 of Fig. 1, showing in plan the control cam mechanism for the gathering ram, for the mechanism for opening the spindle jaws, and for the spindle oscillating mechanism.

Fig. 22 is a detail vertical section, taken substantially on the line 22—22 of Fig. 21.

Fig. 23 is a horizontal section taken substantially on the line 23—23 of Fig. 4.

Fig. 24 is a horizontal section, taken substantially on the line 24—24 of Fig. 1, but showing the finishing molds open.

Fig. 25 is an elevation, partially in section, of the optic molds and supporting and operating mechanism therefor, the view being taken from the side adjacent the central vertical axis of the machine.

Fig. 26 is a vertical section taken substantially on the line 26—26 of Fig. 25.

Fig. 27 is an enlarged vertical section, taken substantially on the lines 27—27 of Figs. 1 and 2.

Fig. 28 is a detail vertical section through the optic puff-valve operating cam.

Figure 1:
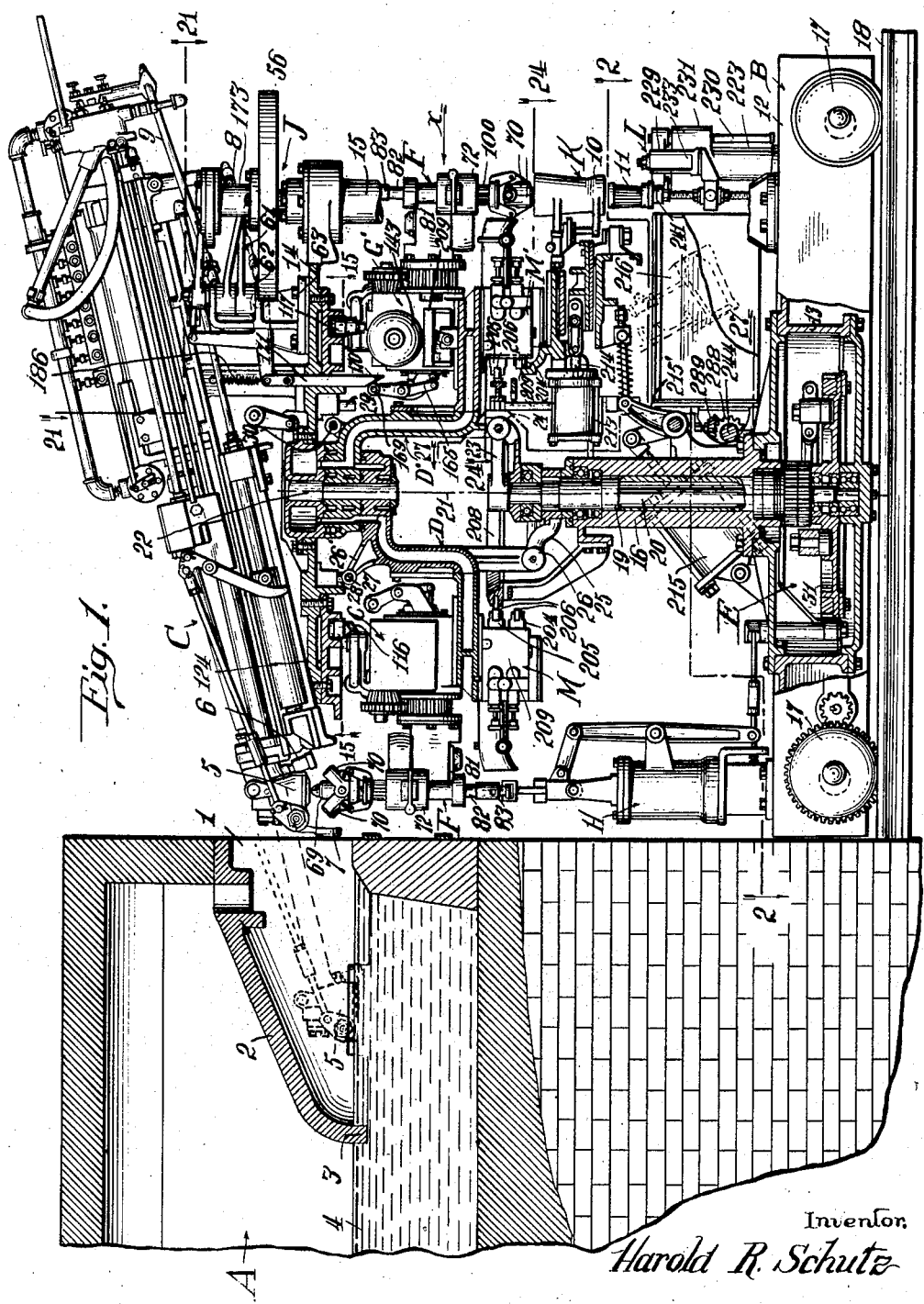
Fig. 1 is a side elevation of the assembled glass working machine and a portion of the furnace, parts of both the machine and furnace being shown in central vertical section.

Briefly described, the apparatus comprises a suitable furnace A from which the molten glass is obtained; a supporting frame for the machine parts indicated generally at B; a gathering ram C for withdrawing the charges of molten glass from the furnace A; a pair of similar swinging heads or carriages D and D'; main driving mechanism indicated generally at E for swinging the heads in properly timed relation to one another; a plurality of similar spindles F, there being four of these spindles in the mechanism here shown, one pair on each head; similar mechanisms G and G' for rotating, oscillating and inverting the spindles; a mechanism H at the gathering station for operating the spindle jaws and plungers; a mechanism J at the blowing or molding station for opening the spindle jaws to discharge the finished ware, also for controlling the ram C, and the spindle-oscillating mechanism G or G'; a mold assembly indicated generally at K; the improved "optic" mechanism L; the air control valves M and M' for respectively controlling the flow of blowing air into the blank or parisons carried by the spindles of heads D and D'; the assembly of control cams indicated at N; and the operating cam mechanism O for actuating the valves M or M' in cooperation with the optic mechanism L. It might be here stated that the parts A to H inclusive, K, M and M' may be substantially the same as those disclosed in said copending application Serial No. 621,854. The mechanisms L and O are new, the mechanism J has been given additional functions and structure, and the cam assembly N has been modified to cooperate with the improved optic mechanism. Many parts that have not been changed will be here only described briefly in order to bring out the operation of the machine as a whole. For more detailed information as to these mechanisms reference may be had to said copending application Serial No. 621,854 in which these parts are disclosed and claimed in detail.

The furnace A has a working opening 1 leading into the boot 2 which has portions 3 projecting downwardly beneath the surface of the molten glass 4 so as to partially segregate a pool of glass from which the gathering molds 5 suck the charges or blanks of glass. The usual shearing knife 6 carried adjacent each mold 5 shears off the excess glass which falls back into the molten pool. The ram assembly C mounted on top of the glass working machine comprises automatically controlled means for projecting the gathering molds 5 into and out of the furnace, operating the shearing knives 6 and mold closures 7 and controlling the vacuum and pressure air connections so that glass will be sucked into the gathering molds and then discharged therefrom. The operations of the ram are timed and controlled from the mechanism J through links 8 and 9 as will be hereinafter described. It might be stated at this point that in the machine here shown there are two gathering molds 5, two spindles F on each working head D and D', two finishing molds 10 in the mold assembly K, and two "optic" molds 11 in the optic assembly L. This is merely for the purpose of doubling the capacity of the machine, and in some of the description which follows only one of the units of each pair will be referred to. In each case, a single mechanism serves to actuate simultaneously both units of each pair.

The main supporting frame B comprises a lower platform 12 formed with a central casing portion 13 in which the larger part of the driving mechanism E is housed, an upper platform 14 supported from lower platform 12 by four hollow cylindrical corner posts 15, and a central tubular standard 16 which carries the bearings for the main central vertical driving shafts. The supporting frame also comprises a number of auxiliary arms and brackets for supporting various portions of the apparatus which do not move from station to station. The frame B is supported by a plurality of wheels 17 resting on the rails 18, and means are provided for moving the machine toward or from the furnace and elevating or lowering the machine so as to properly position the machine with relation to the level of the molten pool 4. A tubular drive shaft 19 and an inner drive shaft 20 are journaled within standard 16 for independent rotation about the central vertical axis 21. Each of the heads D and D' is provided with lower and upper supporting arms journaled for rotation respectively on the drive shaft 20 and a fixed stud 22 projecting downwardly from the upper machine frame 14. In this manner each of the heads D and D' may swing independently about the central vertical axis 21. The drive shaft 20 is connected through means including the crank arm 23 and shock-absorber 24 (see Fig. 24) with head D', and in a similar manner tubular drive shaft 19 is connected through crank arm 25 and shock-absorber 26 with the head D. A bracket arm 26' projecting upwardly from head D carries a pair of buffer members 27 which are adapted to engage alternatively with a pair of downwardly projecting stop pins 28 and 29 on the upper platform 14. The head D swings through an arc of approximately 180° and its movement is limited at each end of this arc by the stop pins 28 and 29. In an exactly similar manner, a stop bracket 30 on the other head D' is adapted to engage a similar pair of stop pins to limit its swinging movement to the opposite arc of 180°. The driving mechanism E (Figs. 1, 2, 4, 5 and 23) comprises a rather large main cam plate 31 which is journaled on the lower portion of shaft 20. A circular gear rack 32 is secured to the periphery of cam 31 and the cam plate is rotated continuously in one direction at a constant speed by an electric motor 32' through connections comprising motor shaft 33, worm gearing in casing 34, transverse shaft 35, bevel gearing 36, vertical stub shaft 37, and the gear 38 meshing with rack 32. The main cam path formed in the upper surface of cam plate 31 (see Fig. 23) comprises arcuate portions 39 and 40 both centered about axis 21 and corresponding to the dwells of the heads at the gathering and blowing stations, and inclined portions 41 and 42 which cause the swinging movements of the heads as they move from one station to the other. The lengths of the arcuate portions of the cam determine the relative lengths of the dwells at the two stations, and the lengths and relative inclinations of the inclined portions determine the speed of movement of the heads as they swing from station to station.

A cam pin or roller 43 which travels in the main cam slot (being shown in the portion 40 thereof in Fig. 23) is carried by a swinging frame 44 pivoted about the stationary journal 45 and also comprising a rack 46 which meshes with a gear 47 pivoted at 48. A rack sector 49 secured to gear 47 meshes with the driving gear 50 at the lower end of vertical shaft 20. It will thus be apparent that the movement of cam roller 43 in the main cam slot will determine the swinging movements of the head D'. As long as the roller 43 is in the portion 40 of the cam slot, no movements will be imparted to the train of racks and gears just described and the head D' will remain stationary in the "blowing" position shown in Fig. 1. When the roller 43 passes into the inclined portion 42 of the cam slot the head D' will be swung rather rapidly backward through an arc of approximately 180° to the gathering station in which the head D is now positioned in Fig. 1. When the cam roller enters the inner arcuate portion 39 of the cam slot the head will dwell in this gathering position. As the roller passes into the outwardly inclined portion 41 of the cam slot the head D' will be swung rather slowly from the gathering position to the blowing position in which it dwells for a comparatively long period of time while passing through the long arcuate portion 40 of the cam slot. A second cam roller 43' is positioned in the cam slot at a diametrically opposite point or approximately 180° from the cam roller 43, and this cam roller is connected through a similar series of gears and racks (indicated by similar primed reference characters) to the driving gear 51 secured to the lower end of driving sleeve 19 so as to swing the other head D. The latter gear train includes one extra idler gear 52 for reversing the direction of the swinging movements imparted to head D. It will thus be seen that the single driving cam 31 will successively impart similar movements to the two heads D and D' but these movements of the two heads will be 180° out of phase with one another, and in opposite directions. The action is such that one of these heads will dwell for a short time during the gathering operation at the gathering station adjacent the furnace and will then swing rather slowly through an arc of 180° to the blowing or molding station where the partially formed parison is acted upon by the mechanisms located at this station and hereinafter described, the head dwelling at this station during these latter operations. The head then swings quickly back in a reverse direction to the gathering station. One of the heads swings through a clockwise arc and the other through a counter clockwise arc and the parts are so timed that only one of the heads will be at either one of the stations at any one time, although one head swings into position at the blowing station very shortly after the other head has left this station so that one or the other of the heads will be at the blowing station substantially all of the time.

A vertical control shaft 53 is suitably journaled within and extends up through one of the tubular frame members or posts 15 at one corner of the machine. (See Figs. 1, 2, 5, 21, 22 and 23.) A gear 54 is keyed on the lower end of shaft 53, and an intermediate gear 55 journaled on the stub shaft 55' connects the gear 54 with the gear rack 32 on cam 31. The relative sizes of the gears are such that the gear 54 and shaft 53 will be rotated twice for each revolution of the main cam 31.

On the upper end of shaft 53, above the frame platform 14, is fixed a cam disk 56. On the upper surface of this cam disk are adjustably secured two pairs of cams 57, 58 and 59, 60. (See Fig. 21.) The inner arm 61 of a bellcrank lever pivoted at 62 in a suitable bracket 63 carries a roller 64 adapted to be successively engaged by cams 57 and 58 to swing the bellcrank about its fulcrum. The other arm 65 of this bellcrank lever is connected by link 8 with a lever on the ram mechanism C which controls the admission of air or vacuum to the gathering head 5. A second bellcrank lever also pivoted at 62 in the bracket 63 has an inner arm 66 provided with a roller 67 which alternately engages the two cams 59 and 60. The outer arm 68 of this bellcrank is connected through link 9 with the lever which controls the movements of the ram-operating cylinder. In this manner the operations of the gathering ram mechanism are automatically controlled and properly timed. The cam 56 will rotate twice for each revolution of the main driving cam 31, so that the cycle of operations of the gathering mechanism will be repeated as each head D or D' dwells at the gathering station.

Each of the spindles F comprises a cup 69, and a pair of clamping jaws 70 (see Figs. 8, 9, 10 and 12) adapted to receive the glass blank when discharged from the gathering mold 5 and hold the blank during the succeeding operations. Each of these spindles comprises a plurality of telescoping sleeves and springs so arranged that the opening and closing of the jaws 70 to receive the glass blank, hold the blank during the forming operation, and discharge the finished article; and the projection of a plunger into the glass blank to form an initial cavity, are accomplished by relative longitudinal movements of the sleeve members against the opposition of certain of the springs. Means are also provided for transmitting air under pressure through the spindle to carry out the blowing operations. The internal mechanism of one of these plungers is disclosed in detail and claimed in my copending application Serial No. 621,854 hereinabove referred to. Certain features of these spindles will be referred to hereinafter.

The spindle-operating mechanisms G and G' comprise means for rotating or oscillating each spindle about its longitudinal vertical axis, and for swinging the spindle about a horizontal axis so as to invert it end for end, that is bring the cup 69 from the upper blank-receiving position shown at the left of Fig. 1 to the lower or parison supporting position shown at the right of Fig. 1 and in Figs. 8, 9 and 10. The spindle-supporting frame 71 (see Figs. 11, 12 and 13) comprises a main cross frame member formed with the two semi-cylindrical rear halves of the bearings for a pair of spindles F, and two semi-cylindrical bearing halves 72 which are pivoted to frame 71 at 73 and provided with clasps 74 centrally pivoted to the members 72 at 75. A spring 76 tends to swing the clasp 74 so that the hook 77 will engage a member 78 on frame 71. By pulling out on the handle 79 the clasp may be unlocked and the member 72 swung back so that the entire spindle assembly may be removed and replaced. The operating collars 80 of the two spindles are engaged in a cross member 81 from the central portion of which extends a stem 82 having an enlarged head 83. Suitable mechanism (hereinafter referred to) engages and reciprocates this head 83 when the spindles are at the gathering station to open and close the jaws and operate the inner plunger. At the blowing station, after the glass article is completed, the head 83 is again reciprocated in one direction to open the jaws and release the finished article.

A frame member 84 extends centrally from cross frame 81 between the two spindles and is movably guided in a central portion of frame 71. A tube 85 is secured through upper and lower platforms 86 and 87 in the frame 84. A pair of expansion springs 88 and 89 surround the tube 85 and are confined between similar spring-retaining washers 90 and 91. A pair of similar cross arms have central annular portions 92 surrounding and slidable on the tube 85, and end portions 93 which slide along guideways 94 on the frame 71. The springs 88 and 89 through retainers 90 and 91 force the cross arms 93 outwardly away from one another and into engagement with the fixed stops 95 on frame 71. This is the normal or neutral position of the parts as shown in Figs. 12 and 13. The springs 88 and 89 are sufficiently powerful to hold all of the spindle assembly in this position whether the spindles are in gathering position or in inverted blowing position. By suitable means hereinafter described which engages with the head 83, the movable assembly comprising the stem 82, cross arm 81 carrying the operating collars 80 of the spindles, and the central frame 84 may be moved in either direction so as to operate the spindle jaws and plunger as already described. These movements will force one or the other of the cross bars 93 toward the center, compressing the springs 88 and 89 since the other cross bar 93 is held against movement in this direction by the stops 95. No matter in which direction this movement has been, the expansion of springs 88 and 89 will tend to return the parts to the neutral position shown in Figs. 12 and 13.

Keys 96 (Fig. 12) on the shafts of the blow-pipe heads 97 are slidable in guides 98 formed on the cross bar 81 so as to hold the heads 97 against rotation and prevent twisting of the air-pipe connections which engage with nipples 99 on the blow-pipe heads 97. The outer sleeve 100 of each spindle F (see Fig. 12) is formed with a circumferential series of longitudinally extending gear teeth which mesh with a driving gear hereinafter described. At 101 is shown one of the operating springs of the spindle assembly.

The spindle-supporting frame 71 is mounted at one end of a gear housing 102 having an inner hollow cylindrical extension 103 connected at 104 to a similar cylindrical member 105, the members 103 and 105 being journaled by means of roller bearings 106 on a tubular member 107 projecting outwardly from the gear casing 108 which in turn is carried by the supporting head D or D'. Sleeve 105 is formed with an annular series of gear teeth 109 which are in mesh with a gear 110 journaled on a stub shaft 111 projecting outwardly from housing 108 (Fig. 18). A swinging frame 112 (Figs. 11, 13 and 18) is pivoted on a vertical stub shaft 113 mounted in the top of gear casing 108, and is formed at its outer end with a downwardly facing arcuate rack 114 which meshes with a bevel gear 115 keyed to the gear 110 already described. One arm 116 of a bellcrank also pivoted on the shaft 113 carries a cam roller 117, the other arm 118 of this bellcrank being formed with a yoke 119 which spans an upward extension 120 of the swinging rack 114. A shock absorbing assembly 121 is mounted in member 120 and engages the side arms of the yoke 119.

The cam roller 117 travels in one of the downwardly opening cam slot 122 or 123 of a cam plate 124 which is mounted beneath the upper frame platform 14 (Figs. 1 and 15). It will be noted that as one of the heads D or D' moves from the gathering to the blowing station or vice versa the roller 117 on this head will travel in the cam slot 122 (or 123) and the bellcrank 116 will swing about the pivot 113. Through the shock absorbing connection 121 this bellcrank will swing the arcuate rack member 114, and through the gear train consisting of bevel gear 115, spur gear 110, and gear teeth 109 will swing the entire spindle-carrying frame about the horizontal axis indicated at 125 in Fig. 13. The cam slots 122 and 123 are so formed that when the heads are in the gathering position the spindles will be turned upwardly as indicated at the left of Fig. 1. As the head swings away from the gathering station the spindles are first turned over to a position somewhat below the horizontal, where they remain for a short time, the spindles being rotated about their longitudinal axes at this time to prevent deforming the partially expanded glass blanks. The spindles are then swung down until completely inverted as shown at the left of Fig. 1 and in Figs. 8, 9 and 10. The spindles remain in this position during the rest of the cycle and until shortly before they are returned to the gathering position.

A pair of adjustable stops 126 and 127 are mounted in arms 128 projecting from the rotatable frame ring 105, these stops engaging with the projecting end portion 129 of the shaft 111 to limit the spindle-swinging movement at each end of the 180° arc of travel. (See Figs. 11 and 19.) The shock absorber 121 will yield to permit a small additional movement of the operating bellcrank after the stops have been engaged thus holding the spindle assembly firmly in either of its inverted positions.

A horizontal drive shaft 130 extends longitudinally through the gear housing 108 and is supported in suitable bearings adjacent its ends (Fig. 13), the outer end of this shaft being connected by a sleeve 131 with a shaft extension 132 journaled at 133 in the tubular member 107 and carrying a bevel gear 134 at its outer end. It will be noted that the shafts 130 and 132, and bevel gear 134 are journaled on the horizontal axis 125 previously referred to about which the spindle assembly is oscillating. A normally vertical shaft 135 is journaled adjacent its ends in the gear housing 102 and carries a bevel gear 136 meshing with the bevel gear 134. A spur gear 137 also secured on shaft 135 meshes with a pair of similar spur gears 138 and 139 (Fig. 19) which engage respectively with the gear teeth 100 on the two spindles F. It will be noted that any rotary or oscillating movement imparted to the drive shaft 130 will be transmitted through the train of gearing just described to the two spindles F. As the spindle assembly is inverted, the bevel gear 136 will simply run around the bevel gear 134 without disturbing this gear train.

Rotatably mounted on the drive shaft 130 are a rotating sleeve 140 and an oscillating sleeve 141 between which is positioned a slidable clutch member 142 keyed to shaft 130. This clutch member 142 is formed at its opposite ends with teeth adapted to engage with similar clutch teeth on the members 140 and 141, respectively.

A constantly rotating motor 143 (Figs. 11 and 14) is supported on the head at one side of gear casing 108 and is connected at 144 with a shaft 145 journaled transversely in housing 108 and carrying a worm 146 (Figs. 17 and 18). Worm 146 meshes with and drives the worm wheel 147 keyed on a transverse counter-shaft 148. Spur gear 149 also keyed on shaft 148 meshes with the spur gear 150 (Fig. 13) formed on rotating sleeve 140 so as to constantly drive this sleeve in one direction. On the projecting end portion 151 of shaft 148 is secured a crank arm 152 (Figs. 18 and 20) carrying a crank pin 153 on which is journaled one end of a link 154 journaled at its other end on a crank pin 155 mounted in a crank arm 156, secured on sleeve 141 (Fig. 13). The crank arm 156 is longer than the crank arm 152 so that a continuous rotary movement of crank 152 will cause an oscillating movement of the longer crank 156, and consequently will impart a continuous oscillating movement to the sleeve 141.

A rock shaft 157 (Figs. 13, 14, 16 and 17) journaled in the lower portion of housing 108 carries a yoke 158 at its inner end, said yoke engaging a groove in the shiftable clutch member 142. A crank arm 159 secured to the outer end of rock shaft 157 carries a pin 160 having a head 161 slidable on push rod 162 between a pair of similar compression springs 163. Longitudinal movements of the push rod 162 will, through the yieldable connection formed by springs 163, swing the crank arm 159 and rock shaft 157 and through yoke 158 will shift the clutch 142 alternately into engagement with either of the sleeves 140 or 141. The other end of push rod 162 is pivotally connected at 164 with the lower arm 165 of a lever intermediately pivoted at 166 in bracket 167. The other arm 168 of this lever carries a cam roller 169 adapted to engage with the inclined cam surface 170 at the lower end of a vertically movable push rod 171 (Figs. 1, 14 and 16). A compression spring 172 confined about the outer portion of push rod 162 serves to normally move the parts in such direction that the clutch member 142 will be in engagement with constantly rotating sleeve 140 so that the spindles F will be rotated continuously about their longitudinal axes as long as the motor 143 is energized and clutch 142 is engaged with sleeve 140. At certain times during the making of so-called "optic" wear, as hereinafter described, it is preferable to oscillate the glass blanks rather than rotate them continuously. At such times the cam 170 is projected downwardly so as to shift the clutch member 142 to a neutral position and subsequently into engagement with the oscillating sleeve 141, thus causing the shaft 130 and the connections therefrom to the spindles to be oscillated instead of rotated. When cam 170 is again elevated, the spring 172 will return the parts to the normal positions so as to cause continuous rotation of the spindles, as long as motor 143 continues to rotate.

Referring again to Figs. 1, 21 and 22, a cam holder 173, mounted at 174 on the cam disk 56 and centered coaxially with shaft 53, has a cam-receiving slot 176 in which cam plate 175 is adjustably mounted by means of screws 177. One arm 178 of a bellcrank lever pivoted at 62 on bracket 63 carries a roller 179 adapted to be engaged by cam 175. The other arm 180 of this bellcrank is connected by link 181 with the arm 182 of a second bellcrank lever pivoted at 183 on a bracket 183'. The other arm 184 of this bellcrank is connected through link 185 with the upper end of push rod 171. A spring 186 tends to hold the cam 170 and rod 171 elevated when roller 179 is not in engagement with cam 175, and to return the parts to this position when the roller 179 passes out of engagement with the cam.

With the parts in this position, clutch 142 will be in engagement with sleeve 140 and the spindles will rotate continuously in one direction (that is provided the motor 143 is operating). Cam 175 rotates in the direction of the arrow (Fig. 21) and when the inclined portion 187 of the cam engages with roller 179 it will swing the bellcrank until roller 179 passes onto the arcuate portion 188 of the cam. At this time the clutch 142 will have been moved to neutral position between the sleeves 140 and 141 (as shown in Fig. 13) and the spindles will be idle. When the roller 179 is engaged by inclined portion 189 of the cam and moved up onto the high arcuate portion 190, the clutch will be moved over into engagement with sleeve 141 so that the spindles will oscillate as long as roller 179 is engaged with portion 190 of cam 175. As the roller 179 runs off of the other end of the cam at 191, the spring 186 will return the parts to the first position moving cam 170 out of engagement with roller 169 and permitting spring 172 to return the clutch 142 to its original position in engagement with sleeve 140 so that the spindles will continue to rotate as long as motor 143 is operating. The reason for imparting these various movements to the spindle while at the blowing station will be explained hereinafter, after the "optic" mechanism has been described.

Still referring to Figs. 1, 21 and 22, it will be noted that a slide 192 movable in a slideway 193 mounted on frame platform 14, carries a roller 194 movable in a cam slot 195 formed on the lower surface of cam disk 56. A link 196 connects slide 192 with one arm of a bellcrank lever 197 pivoted at 198, the other arm of the bellcrank being connected through link 199 with a push rod 200 vertically slidable through a slideway 201 in platform 14. The head 83 at the upper end of spindle-shifting stem 82 will move into the yoke 202 at the lower end of slide rod 200 when the spindle arrives at the blowing station. When the inwardly projecting portion 203 of cam slot 195 engages the roller 194, slide rod 200 will be projected downwardly so as to depress the operating stem 82 thereby causing spindle jaws 70 to open and release the finished glass article.

The mechanism H (Fig. 1) positioned beneath the spindles when at the gathering station is also adapted to engage the head 83 of operating stem 82 and move the spindles longitudinally. This mechanism H (disclosed more in detail in said co-pending application Serial No. 621,854) comprises a fluid-pressure operated cylinder adapted to successively shift the spindles in opposite directions from a neutral position so as to first elevate the spindles, and open the jaws 70 to receive the glass blanks from gathering molds 5, and to subsequently lower the spindles beyond the normal position so as to project plungers (in the spindles and not here shown) into the blanks to form initial openings to receive the air which expands the blanks.

The similar valve operating mechanisms M and M' (see Figs. 1 and 24) which control the flow of air under pressure into the interior of the glass blanks carried by the heads D and D' respectively, comprises a pair of operating plungers 204 and 205 each having a roller 206 at its inner end which projects toward the central vertical axis 21. The plungers 205 are adapted to control valves for admitting puffs of air into the glass blank to partially expand it as it is moving from the gathering station to the molding station. The plungers 205 are operated by a plurality of stationary cams 207 positioned at suitable intervals along the fixed circular frame rail 208 (see Fig. 24). The plungers 205 are also operated by mechanism hereinafter described in detail for admitting air to the interior of the parison while dwelling at the finishing or molding station while the optic molds 11 are positioned about the parisons. The plungers 204 are operated by a bracket member 209 in the finishing mold mechanism K to admit blowing air to the interior of the parisons after the finishing molds 10 have been moved into position about the parisons.

Each of the blow molds or finishing molds 10 comprises a pair of similar separable sections 210 and 211 pivoted to swing about a vertical axis 212. Suitable mechanism is provided for swinging the mold sections from the open position shown in Fig. 24 to the closed position shown in Figs. 1 and 10. These opening and closing operations are performed by fluid pressure cylinder 213. When air under pressure is admitted to one end of this cylinder the mold sections will be moved to closed position, and when pressure air is admitted to the opposite end of the cylinder the molds will be opened. The bracket 209 for pushing in the slide or plunger 204 which opens the valve controlling the blowing air is also carried by the mold closing mechanism and is moved into engagement with the plunger 204 when the mold is closed. The mold supporting carriage is mounted to swing about a horizontal axis 214, being actuated from fluid-pressure cylinder 215 through the lever and link connections indicated generally at 215'. When pressure air is admitted to one end of this cylinder the mold assembly will be moved up to the position shown in solid lines in Fig. 1, after which air admitted to cylinder 213 will close the molds about the suspended parisons. After the molds have been opened, air admitted to the opposite end of cylinder 215 will swing the molds down to the position shown in dotted lines in Fig. 1, at which time the opened molds will be immersed in a cooling liquid contained in the tank 216.

Each of the optic molds 11 (Figs. 1, 2, 9, 24, 25 and 26) is of substantially well-known type, being formed with downwardly converging side walls within which is a circular series of parallel spaced apart inwardly projecting vertical ribs 217, between which may be open slots 218 to aid in cooling the mold and permitting the escape of steam. The mold has an adjustable bottom 219 in the form of a block of wood usually covered with a paper top 220 which is moistened so that it may contact the bottom of the molten glass blank without marring it.

The glass-treating operation will be best understood from a consideration of Figs. 8, 9 and 10. When the spindle F moves into position at the blowing station it will have suspended therefrom a partially formed hollow glass parison 221, as shown in Fig. 8. The optic mold 11 is now moved up about this suspended parison and a puff of air is admitted to the interior of the parison so as to expand it into engagement with the ribs 217, thus slightly chilling the walls of the blank at spaced intervals along the lines where it engages with these ribs. This operation is illustrated in Fig. 9. The engagement of the parison with the optic mold is only momentary, after which the optic mold 11 is lowered and the blow mold or finishing mold 10 is then moved into position about the parison and blowing air is admitted to the interior of the blank or parison to expand it within the blow mold as illustrated in Fig. 10. When so expanded, the chilled portions which formerly contacted with the ribs 217 of the optic mold 11 will not stretch as much as the intermediate hotter portions, with the result that the walls of the glass article 222 formed within mold 10 will vary in thickness at spaced intervals thus providing the desired wavy appearance as the light passes therethrough. After the blowing operation is completed, the blow molds 10 are opened and swung down into tank 216 after which the spindle jaws 70 are opened by the mechanism J and the finished article is released and removed.

The mechanism for supporting the optic molds 11 and moving them into and out of position about the glass blank will now be described. A vertically positioned fluid-pressure cylinder 223 is supported on the machine frame 12 adjacent the end of tank 216 remote from the central axis of the machine. Cylinder 223 contains a piston 224, fluid under pressure being admitted below and above this piston alternately through pipe connections 225 and 226. The piston rod 227 projects upwardly from the piston 224 through a packing 228 in the top of the cylinder, and the upper end of the piston rod is secured in and supports the carriage 229. A pair of similar guide stems 230 are secured at their upper ends in the carriage 229 and project slidably downward through ears 231 on the cylinder. These guide stems prevent rotary movement of the carriage and the molds carried thereby about the vertical axis of the cylinder, and the engagement of the heads 232 on the lower ends of the stems with the ears 231 limit the upward movement of the carriage. The carriage 229 is in the form of a yoke comprising similar side arms 233 which project downwardly and then horizontally, the end portions being formed as open loops 234 in which are positioned blocks 235 which are held in place and adjusted laterally by the screws 236. In each block 235 is positioned a bushing 237 through which a threaded sleeve 238 is adjustable vertically and held in place by nuts 239 and 240 above and below the bushing. The sleeve 238 is secured in and supports the lower portion 241 of the optic mold 11. A threaded stem 242 supports the adjustable bottom 219 of the mold, this stem meshing in an internally threaded portion of sleeve 238 and projecting downwardly through the lower end of this sleeve so that the mold bottom may be adjusted by screwing the non-circular lower end portion 243 of stem 242. This optic mold assembly is so positioned at the blowing station that the molds 11 will be directly below the spindles F and parisons 221 when the spindles are moved into position to dwell at this station. By means of the various adjustments hereinabove referred to, each mold 11 may be adjusted both vertically and laterally so that it will be properly positioned about the glass blanks or parisons when elevated.

Referring now to Figs. 2, 3, 4 and 6, one end of a horizontal counter shaft 244 is driven from motor-driven shaft 35 through gears 245 and 246. A pair of beveled pinions 247 and 248 keyed on the opposite end portion of shaft 244 mesh with and drive a pair of bevel gears 249 and 250 all mounted within a gear housing 251. The gear 249 is keyed on one end of a cam shaft 252 rotatable in bearings 253 and 254 in the housing 255. Gear 250 is keyed on one end of a tubular cam sleeve 256 which is journaled between one end portion of shaft 252 and bearing 253. The relative sizes of the gears 249 and 250 are such that the shaft 252 will rotate twice for each revolution of sleeve 256. The shaft 252 makes two complete rotations for each complete cycle of operations of the machine, that is shaft 252 rotates twice for each complete cycle of movements on either one of the spindle heads. The shaft 252 carries all of the cam mechanisms which control the devices which operate successively for each of the heads D and D'. On the other hand, the sleeve 256 only rotates once for each complete cycle of movements of either one of the heads, and on this sleeve are mounted the cam assemblies f and g which control the respective switch mechanisms 257 and 258 for controlling the two spindle-operating motors 143.

The several cam assemblies on shaft 252 may be all of similar construction and have been indicated by the characters a to e respectively. Each of the cam disks 259 comprises a pair of spaced flanges 260 and 261 between which is a slot 262 in which are mounted the cam sectors 263 held in place by screws 264 inserted through one of the flanges 261.

The cam mechanisms a and b control the valves for admitting pressure fluid to the respective ends of cylinder H, hereinabove referred to, which opens and closes the jaws 70 and projects the plungers of the several spindle assemblies. The cams c control the blow mold swinging cylinder 215. The cams d control the mold opening and closing cylinder 213. The cams e control the flow of pressure fluid to the respective ends of the optic-mold operating cylinder 223.

Referring now more particularly to Fig. 7, the cam assembly e and its cooperating parts will be described more in detail, and it will be understood that this description will serve also for cam assemblies a to d inclusive which may be of similar construction except for the spacing of the cams. The air manifold 265 is connected by pipe 266 with a suitable source of air under pressure. A branch pipe 267 controlled by cutoff valve 268 leads from manifold 265 into the valve chamber 269. From this valve chamber lead ports 270, 271 and 272. The slide valve 273 movable within chamber 269 by means of the projecting valve stem 274 has a recess or pocket 275 adapted to bridge alternatively either the ports 270 and 271 or the ports 271 and 272. From port 270 leads pipe 226 extending to the top of "optic" cylinder 223. From port 272 leads pipe 225 extending to the bottom of cylinder 223. The intermediate port 271 connects with an exhaust conduit. The bellcrank lever 277 pivoted intermediately at 278 on a stationary bracket 279 comprises a pair of arms 280 and 281 respectively carrying cam-engaging rollers 282 and 283. A third arm 284 of the lever is connected by link 285 with the lower end of valve stem 274. The cam disk 259 is provided with a pair of cams 286 and 287 adapted to engage respectively with the rollers 283 and 282. The cam assembly rotates in the direction of the arrow. In the normal position of the parts as shown in Fig. 7 the air pressure is in communication through port 270 with pipe 226 leading to the top of the optic cylinder 223 so that the optic molds will be held in lowered position. At the same time, pipe 225 leading from the lower end of this cylinder is in communication with the exhaust port 271.

When the cam disk 259 has made nearly one-half a revolution from the position shown in Fig. 7, the cam 286 will engage the roller 283 and swing the bellcrank so as to elevate the slide valve 273 thus placing pipe 226 in communication with the exhaust port and admitting pressure fluid from chamber 269 through port 272 to the pipe 225 leading to the bottom of cylinder 223. This will cause the upward movement of the piston 224 and will elevate the optic molds about the suspended glass parisons. Almost immediately thereafter the cam 287 will engage the other roller 282 so as to return the bellcrank and the slide valve to the original positions as shown in Fig. 7. It will be understood that the cams 286 and 287, and the rollers 282 and 283 are offset with relation to each other so that each cam will contact only its individual roller.

It will be understood that the cams f and g are so positioned as to open and close the switches 257 and 258, (in a manner similar to the operation of cams e), so as to alternately stop and start the motors 143. The motors will rotate continuously from the time the spindles leave the gathering station until the glass articles are completed at the blowing station. The motors are then stopped so that the spindles are idle while the finished articles are discharged; during the return trip to the gathering station and during the dwell at the gathering station. When plain ware is being made, the clutches 142 are continuously in engagement with the sleeves 140 so that the spindles will rotate continuously as long as motors 143 are running. It will be understood that the cam 175 is removed when plain ware is being made so that the mechanism actuated thereby will be inoperative.

When "optic" ware is being made, the cam 175 is used. The mechanism operated thereby is so timed that during the short period of time that the optic molds are elevated about the parisons the roller 179 will be in engagement with cam surface 188 and the clutch will be shifted to neutral position so that the spindles will be idle. Immediately after this "optic" operation the roller 179 will pass onto the outer portion 190 of the cam so as to shift the clutch into engagement with sleeve 141 and cause the spindles to oscillate. It has been found that if the parisons are rotated continuously in one direction during the first part of the blowing operation, while the parisons are still quite soft, the chilled lines formed by the optic mold will be twisted in one direction, whereas the twisting will be avoided if the parisons are oscillated alternately in opposite directions within the blow-molds 10 until the glass articles are substantially set or rigid. At this time the roller 179 runs off the end of cam surface 190 and clutch 142 is now shifted almost immediately back into engagement with sleeve 140 so that the glass articles are rotated within blow-molds 10 during the remainder of the blowing operation to give the desired polish to the glass articles before they are removed from the molds.

Referring now to Figs. 1, 2, 24, 27 and 28, the mechanism O comprising a bevel pinion 288 keyed to an intermediate portion of counter shaft 244, this pinion meshing with a bevel gear 289 on the lower end of a vertical shaft 290 journaled in bearings 291 and 292 in a housing 293. A cam disk 294 provided with a cam slot 295 is secured on the upper end of shaft 290. A cam sector 296 is adjustably positioned in slot 295 by means of a screw 297 selectively positioned in one of the threaded openings 298 in the cam disk and engaging in an arcuate groove 299 formed in cam sector 296 (see Fig. 28). A vertically extending shaft 300 journaled in bracket 301 has keyed on its lower end portion a crank-arm 302, in the outer downwardly curved end portion of which is mounted an adjusting screw 303. This screw bears against the upwardly curved end portion of one arm 304 of a bell-crank lever pivoted on the lower end portion of shaft 300, the other arm 305 of this lever carrying a roller 306 positioned to be engaged by the cam 296. A crank-arm 307 secured on the upper end of shaft 300 is connected through link 308 with one end of a lever 309, the other end of lever 309 being pivoted at 310 in the fixed frame member 208. Lever 309 is formed intermediate its ends with a button 311 adapted to engage the roller 206 on the puff-valve operating slide 205.

It will be noted that when the rotating cam 296 engages the roller 306 it will swing this connected series of levers so as to force button 311 against the puff-valve operating slide 205 and cause this valve to be momentarily opened so as to admit a puff of air within the hollow parisons 221 and partially expand same within the optic-mold 11, all as shown in Fig. 9. A spring 312 connected between a fixed pin 313 and the lever 309 tends to retract the lever system and permit the valve to close as soon as the cam 296 has passed beyond roller 306. The clearance between button 311 and valve operating roller 206 can be adjusted by changing the position of screw 303 in lever arm 302. The cam sector 296 will be so adjusted in the cam disk 294 that the valve will be opened during the very short period of time that optic mold 11 is elevated about the hollow parison 221, and the valve will immediately close again before the optic mold is lowered away from the parison. It will be understood that the cam 296 makes one rotation for each cycle of operations of each of the heads D and D'.

One complete cycle of operations for one of the heads, for example D, will now be briefly described assuming that "optic" ware is being made. During the dwell of this head at the gathering station, the motor 143 and the spindles F are idle and the ram C operates to deliver charges of glass to the two spindles carried by the head. The motor is now started and the spindles rotate and the head now swings about the central vertical axis 21 from the gathering station to the blowing station. During this swinging movement the spindles are rotated about their longitudinal axes continuously and the spindles are also swung about a horizontal axis through 180° so that the blanks or parisons will hang downwardly. During this swinging movement of the head from one station to the other the fixed cams 207 are engaged by the puff-valve slide 205 to admit puffs of air at intervals to the blanks and partially expand them so that each parison will assume substantially the form shown in Fig. 8. Immediately after the spindles start their dwell at the blowing station, the rotary cam 175 acts to project cam 179 downwardly and cause clutch 142 to be shifted to neutral position thus stopping the rotation of the spindles, and the rotary cam 286 actuates slide valve 273 to cause the optic molds 11 to be elevated about the parisons. At this time rotary cam 296 acts through the intermediate lever mechanism hereinabove described to actuate the puff-valve 205 and admit air to the parisons 221 to partially expand them into contact with the ribs 217 in the optic molds. Immediately thereafter the rotary cam 287 acts to lower the optic molds away from the parisons and the cams c and d now successively act to admit fluids to one end of each of the cylinders 215 and 213 and cause the blow molds 10 to be swung from tank 216 and closed about the parisons, and bracket 239 engages the blow-valve plunger 204 to cause blowing air to be admitted to the parisons. At this time the rotary cam 175 has acted to shift clutch 142 into engagement with the sleeve 141 and the spindles are oscillated for a time during the blowing operation after which the roller 179 runs off of cam 175 and the spindles are then rotated continuously in one direction during the remainder of the blowing operation. As soon as this final blowing operation has been completed, cams d and c act to successively admit pressure fluid to the opposite ends of cylinders 213 and 215 thus successively causing the blowing air to be cut off, the blow-molds 10 to be opened, and the blow-molds to be swung down into tank 216. At this time the motor 143 is stopped so that the spindles cease rotating and the mechanism J now acts to open the spindle jaws and release the finished glass articles, after which the head swings back quickly to the gathering station to receive new charges of glass from the ram C. During the latter phases of this cycle, the other head D' has received charges from the ram C and has been moved toward the blowing station so that it will move into position and dwell at this station soon after the head D has swung away therefrom. The optic and blowing operations are now repeated for this other head D'. It will be noted that the optic and blowing mechanisms are operated twice for each complete cycle of the operation of the machine as a whole, that is once for each cycle of operations of each head D or D'.

The improved portions of the machine hereinabove disclosed have several advantages over the prior apparatus disclosed in my copending application Serial No. 621,854. In this improved machine only one optic mechanism is required, instead of a separate mechanism for each head as in the prior apparatus. The heads do not make any intermediate dwells for the optic operation but travel continuously from the gathering station to the blowing station. The elapsed time between the optic operation and the final blowing operation is considerably shortened, and in this way the operation of the machine is speeded up and better results are obtained. This is also of advantage when plain ware is being made on this same machine, since the idle time prior to the blowing operation is minimized. There is also a saving of power since fewer stops are made and there is less inertia of the heavy operating parts to be overcome. The improvements in mechanisms G and J whereby the oscillation of the spindles may be quickly changed to continuous rotation after the glass articles are sufficiently set in the blowing-molds, thus permitting the desired polishing of the glass articles, is also a distinct advantage over the method and apparatus formerly disclosed.

I claim:

1. In a glass working apparatus, in combination with a spindle adapted to support a hollow glass blank and direct air thereinto to expand the blank, mechanism for moving the spindle to and from a station with a dwell at the station, a valve for controlling the flow of air into the blank, a mold positioned at the station having an open upper end and normally located below the position of the blank when at the station, a fluid pressure cylinder, a piston in the cylinder, a carriage for supporting the mold, means connecting the piston with the carriage, a valve for controlling the flow of pressure fluid alternately into the respective ends of the cylinder to raise and lower the mold, and means operated in timed relation to the spindle movements to successively actuate the valves.

2. In a glass working apparatus, in combination with a spindle adapted to support a hollow glass blank and direct air thereinto to expand the blank, mechanism for moving the spindle to and from a station with a dwell at the station, a valve for controlling the flow of air into the blank, a mold positioned at the station having an open upper end and normally located below the position of the blank when at the station, a fluid pressure cylinder, a piston in the cylinder, a carriage for supporting the mold, means connecting the piston with the carriage, a valve for controlling the flow of pressure fluid into the cylinder to raise and lower the mold, and means operated in timed relation to the spindle movements to actuate the second valve to raise the mold about the blank, then actuate the first valve to admit air to the blank, and then actuate the second valve to lower the mold.

3. In a glass working apparatus, in combination with a spindle adapted to support a hollow glass blank and direct air thereinto to expand the blank, mechanism for moving the spindle to and from a station with a dwell at the station, a valve for controlling the flow of air into the blank, a mold positioned at the station having an open upper end and normally located below the position of the blank when at the station, a fluid pressure cylinder, a piston in the cylinder, a carriage for supporting the mold, means connecting the piston with the carriage, a valve for controlling the flow of pressure fluid into the cylinder to raise and lower the mold, a constantly driven motor means for operating the spindle moving mechanism, a plurality of constantly rotating cams driven from the motor means, and means actuated by the cams for successively actuating the valves in timed relation to the spindle movements.

4. In a glass working apparatus, in combination with a spindle adapted to support a hollow glass blank and direct air thereinto to expand the blank, mechanism for moving the spindle to and from a station with a dwell at the station, a valve for controlling the flow of air into the blank, an optic mold having an open upper end and normally located below the position of the blank when at the station, a sectional finishing mold located at the station, fluid pressure operated means for separately moving each mold into position about the blank, valves for controlling the flow of pressure fluid to the last mentioned means, and means operated in timed relation to the spindle movements to successively operate the several valves.

5. In a glass working apparatus, in combination with a spindle adapted to support a hollow glass blank and direct air thereinto to expand the blank, mechanism for moving the spindle to and from a station with a dwell at the station, a valve for controlling the flow of air into the blank, an optic mold having an open upper end and normally located below the position of the blank when at the station, a sectional finishing mold located at the station, fluid pressure operated means for separately moving each mold into position about the blank, valves for controlling the flow of pressure fluid to the last mentioned means, a constantly driven motor means for operating the spindle moving mechanism, a plurality of constantly rotating cams driven from the motor means, and means actuated by the cams for successively actuating the valves in timed relation to the spindle movements.

6. In a glass working apparatus, in combination with a spindle adapted to support a hollow glass blank and direct air thereto to expand the blank, mechanism for moving the spindle to and from a station with a dwell at the station, a valve for controlling the flow of air into the blank, an optic mold having an open upper end and normally located below the position of the blank at the station, a fluid pressure cylinder, means operated by the cylinder for supporting the optic mold and elevating or lowering it to or from a position about the blank, a sectional finishing mold at the station, a pair of fluid pressure cylinders, means actuated by one of these cylinders to move the finishing mold to or from a position adjacent the blank, means operated by the second of these cylinders to open and close the finishing mold, valves for separately controlling the flow of pressure fluid to each of the several cylinders, and means operated in timed relation to the spindle movements to successively actuate the several valves.

7. In a glass working apparatus, in combination with a spindle adapted to support a hollow glass blank and direct air therein to expand the blank, mechanism for moving the spindle to and from a station with a dwell at the station, a valve for controlling the flow of air into the blank, an optic mold having an open upper end and normally located below the position of the blank at the station, a fluid pressure cylinder, means operated by the cylinder for supporting the optic mold and elevating or lowering it to or from a position about the blank, a sectional finishing mold at the station, fluid pressure operated means for moving the finishing mold to and from position adjacent the blank and for opening and closing the mold, valves for controlling the flow of pressure fluid to the last mentioned means, and means operated in timed relation to the spindle movements to successively actuate the several valves.

8. In a glass working apparatus, in combination with a spindle adapted to support a hollow glass blank and direct air thereinto to expand the blank, mechanism for moving the spindle to and from a station with a dwell at the station, a valve for controlling the flow of air into the blank, an optic mold having an open upper end and normally located below the position of the blank at the station, a fluid pressure cylinder, means operated by the cylinder for supporting the optic mold and elevating or lowering it to or from a position about the blank, a sectional finishing mold at the station, a pair of fluid pressure cylinders, means actuated by one of these cylinders to move the finishing mold to or from a position adjacent the blank, means operated by the second of these cylinders to open and close the finishing mold, valves for separately controlling the flow of pressure fluid to each of the several cylinders, a constantly driven motor means for operating the spindle moving mechanism, a plurality of constantly rotating cams driven from the motor means, and means actuated by the cams for successively actuating the valves in timed relation to the spindle movements.

9. In a glass working apparatus, in combination with a spindle adapted to support a hollow glass blank and direct air thereinto to expand the blank, mechanism for moving the spindle to and from a station with a dwell at the station, a valve for controlling the flow of air into the blank, an optic mold having an open upper end and normally located below the position of the blank at the station, a fluid pressure cylinder, means operated by the cylinder for supporting the optic mold and elevating or lowering it to or from a position about the blank, a sectional finishing mold at the station, fluid pressure operated means for moving the finishing mold to and from position adjacent the blank and for opening and closing the mold, valves for controlling the flow of pressure fluid to the last mentioned means, a constantly driven motor means for operating the spindle moving mechanism, a plurality of constantly rotating cams driven from the motor means, and means actuated by the cams for successively actuating the valves in timed relation to the spindle movements.

10. In a glass working apparatus, in combination with a spindle adapted to support a hollow glass blank and direct air thereinto to expand the blank, mechanism for moving the spindle to and from a station with a dwell at the station, a valve movable with the spindle to and from the station for controlling the flow of air into the blank, a plunger movable with the valve for opening and closing the valve, an optic mold having an open upper end and normally located below the position of the blank at the station, a fluid pressure cylinder, means operated by the cylinder for elevating or lowering the mold into or out of position about the blank, a valve for controlling the flow of pressure-fluid into the cylinder to raise or lower the mold, and means operated in timed relation to the spindle movements to successively actuate the valves, said latter means including a movable member positioned at the station to engage and operate the plunger.

11. In a glass working apparatus, in combination with a spindle adapted to support a hollow glass blank and direct air thereinto to expand the blank, mechanism for moving the spindle to and from a station with a dwell at the station, a valve movable with the spindle to and from the station for controlling the flow of air into the blank, a plunger movable with the valve for opening and closing the valve, an optic mold having an open upper end and normally located below the position of the blank at the station, a fluid-pressure cylinder, means operated by the cylinder for elevating or lowering the mold into or out of position about the blank, a valve for controlling the flow of pressure-fluid into the cylinder to raise or lower the mold, a constantly driven motor means for operating the spindle moving mechanism, a plurality of constantly rotating cams driven from the motor means, and means actuated by the cams for successively operating the valves in timed relation to the spindle movements, said latter means including a movable member positioned at the station to engage and operate the plunger.

12. In a glass working apparatus, in combination with a spindle adapted to support a hollow glass blank and direct air thereinto to expand the blank, means comprising a carriage for supporting and moving the spindle to and from a station with a dwell at the station, a mold at the station movable into and out of position about the blank, means for moving the mold, means on the carriage for selectively oscillating and rotating the spindle about its longitudinal axis, and means for automatically controlling the several means in timed relation so that the mold will be moved into position about the blank while the carriage dwells at the station, and the spindle will be successively oscillated and then rotated while the blank is within the mold.

13. In a glass working apparatus, in combination with a spindle adapted to support a hollow glass blank and direct air thereinto to expand the blank, means comprising a carriage for supporting and moving the spindle to and from a station with a dwell at the station, a pair of molds at the station separately but successively movable into and out of position about the blank, means for moving the molds, means on the carriage for selectively rotating and oscillating the spindle about its longitudinal axis or permitting the spindle to remain idle, and means for controlling the several operating means in timed relation so that the molds will be successively moved into position about the blank while the carriage is dwelling at the station, the spindle will be idle while the first mold is positioned about the blank, and the spindle will be successively oscillated and then rotated while the second mold is positioned about the blank.

14. In a glass working apparatus, in combination with a spindle adapted to support a hollow glass blank and direct air thereinto to expand the blank, mechanism comprising a carriage for supporting and moving the spindle to and from a station with a dwell at the station, means on the carriage for selectively rotating and oscillating the spindle about its central longitudinal axis, and mechanism positioned at the station and operated in timed relation to the carriage-moving mechanism and cooperating with the means on the carriage to determine and time the movements of the spindle while dwelling at the station.

15. In a glass working apparatus, in combination with a spindle adapted to support a hollow glass blank and direct air thereinto to expand the blank, mechanism comprising a carriage for supporting and moving the spindle to and from a station with a dwell at the station, means on the carriage comprising a motor, transmission gearing and a clutch for selectively rotating and oscillating the spindle about its central longitudinal axis, a movable member on the carriage for positioning the clutch to determine whether the spindle shall idle, rotate or oscillate while the motor is rotating continuously, and mechanism positioned at the station and operated in timed relation to the carriage-moving mechanism and adapted to engage and move the member on the carriage to determine and time the movements of the spindle while at the station.

16. In a glass working apparatus, in combination with a spindle adapted to support a hollow glass blank and direct air thereinto to expand the blank, mechanism comprising a carriage for supporting and moving the spindle to and from a station with a dwell at the station, means on the carriage comprising a motor, transmission gearing and a clutch for selectively rotating and oscillating the spindle about its central longitudinal axis, a movable member on the carriage for positioning the clutch to determine whether the spindle shall idle, rotate or oscillate while the motor is rotating continuously, means positioned at the station and adapted to engage and cooperate with the movable member on the carriage to determine and time the movements of the spindle while at the station, an optic mold having an open upper end and normally located below the position of the blank when at the station, a sectional finishing mold located at the station, fluid-pressure operated means for successively but separately moving these molds into position about the blank, valves for controlling the flow of pressure fluid to the last mentioned means, a valve for controlling the flow of air into the blank, and means operated in timed relation to the carriage-moving mechanism for operating the valves and the mechanism at the station which controls the spindle movements.

17. In a glass working apparatus, in combination with a spindle adapted to support a hollow glass blank and direct air thereinto to expand the blank, mechanism comprising a carriage for supporting and moving the spindle to and from a station with a dwell at the station, means on the carriage comprising a motor, transmission gearing and a clutch for selectively rotating and oscillating the spindle about its central longitudinal axis, a movable member on the carriage for positioning the clutch to determine whether the spindle shall idle, rotate or oscillate while the motor is rotating continuously, means positioned at the station and adapted to engage and cooperate with the movable member on the carriage to determine and time the movements of the spindle while at the station, an optic mold having an open upper end and normally located below the position of the blank when at the station, a sectional finishing mold located at the station, fluid-pressure operated means for successively but separately moving these molds into position about the blank, valves for controlling the flow of pressure fluid to the last mentioned means, a valve for controlling the flow of air into the blank, a continuously running motor, and a plurality of rotary cams driven by this motor and operating in properly timed relation to one another the several valves, the carriage moving mechanism, and the mechanism for controlling the spindle movements.

18. In a glass working apparatus in combination with a spindle adapted to support a hollow glass blank and direct air thereinto to expand the blank, mechanism comprising a carriage for supporting and moving the spindle to and from a station with a dwell at the station, means on the carriage comprising a motor, transmission gearing and a clutch for selectively rotating and oscillating the spindle about its central longitudinal axis, a movable member on the carriage for positioning the clutch to determine whether the spindle shall idle, rotate or oscillate while the motor is running continuously, means positioned at the station and adapted to engage and cooperate with the movable member on the carriage to determine and time the movements of the spindle while at the station, an optic mold having an open upper end and normally located below the position of the blank while at the station, a sectional finishing mold located at the station, means for successively but separately moving these molds into position about the blank, and means for automatically timing the movements of these several elements so that the spindle will rotate as it moves to and stops at the station, the spindle will be idle while the optic mold is raised into engagement therewith, the spindle will then oscillate for a time when the blank is expanded within the finishing mold and will then rotate for a time while the blank is still within the finishing mold.

19. In a glass working apparatus in combination with a spindle adapted to support a hollow glass blank and direct air thereinto to expand the blank, mechanism comprising a carriage for supporting and moving the spindle to and from a station with a dwell at the station, means on the carriage comprising a motor, transmission gearing and a clutch for selectively rotating and oscillating the spindle about its central longitudinal axis, a movable member on the carriage for positioning the clutch to determine whether the spindle shall idle, rotate or oscillate while the motor is running continuously, means positioned at the station and adapted to engage and cooperate with the movable member on the carriage to determine and time the movements of the spindle while at the station, an optic mold having an open upper end and normally located below the position of the blank while at the station, a sectional finishing mold located at the station, means for successively but separately moving these molds into position about the blank, means for controlling the flow of air into the blank, and means for automatically timing the movements of these several elements so that the spindle will rotate as it moves to and stops at the station, the spindle will be idle while the optic mold is raised into engagement therewith and air will be admitted to the blank to partially expand it, the spindle will then be oscillated for a time and air will be admitted to the blank after the finishing mold has been positioned about the blank, and subsequently the spindle will be rotated while the finishing mold is still positioned about the blank.

20. In a glass working apparatus in combination with a spindle adapted to support a hollow glass blank and direct air thereinto to expand the blank, mechanism comprising a carriage for supporting and moving the spindle to and from a station with a dwell at the station, means on the carriage comprising a motor, transmission gearing and a clutch for selectively rotating and oscillating the spindle about its central longitudinal axis, a movable member on the carriage for positioning the clutch to determine whether the spindle shall idle, rotate or oscillate while the motor is running continuously, means positioned at the station and adapted to engage and cooperate with the movable member on the carriage to determine and time the movements of the spindle while at the station, a mold positioned at the station and movable into and out of position about the blank, means for moving the mold, and means for timing the movements of the mold and the member-moving means at the station so that the spindle will be successively oscillated and then rotated while the blank is within the mold.

HAROLD R. SCHUTZ.